United States Patent
Rhodes, III

(10) Patent No.: US 8,600,865 B2
(45) Date of Patent: *Dec. 3, 2013

(54) SOLID PHASE BIOMASS CARBON STORAGE (SPBCS)

(75) Inventor: James S. Rhodes, III, La Jolla, CA (US)

(73) Assignee: 1234 10th Street LLC, Sammarnish, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/608,828

(22) Filed: Sep. 10, 2012

(65) Prior Publication Data

US 2012/0330726 A1    Dec. 27, 2012

Related U.S. Application Data

(63) Continuation of application No. 13/192,182, filed on Jul. 27, 2011, now Pat. No. 8,280,795.

(60) Provisional application No. 61/374,953, filed on Aug. 18, 2010.

(51) Int. Cl.
    *G06Q 40/00* (2012.01)

(52) U.S. Cl.
    USPC .......................................................... 705/37

(58) Field of Classification Search
    USPC .......................................................... 705/37
    See application file for complete search history.

(56) References Cited

U.S. PATENT DOCUMENTS

| | | | |
|---|---|---|---|
| 6,355,456 B1 | 3/2002 | Hallberg et al. | |
| 6,718,653 B1 | 4/2004 | Sartorio | |
| 7,381,550 B2 | 6/2008 | Hallberg et al. | |
| 7,662,616 B2 | 2/2010 | Hazlebeck et al. | |
| 7,749,291 B2 | 7/2010 | Seidel | |
| 7,853,436 B2 | 12/2010 | McConnell et al. | |
| 2008/0183523 A1* | 7/2008 | Dikeman | 705/7 |
| 2009/0215137 A1 | 8/2009 | Hawkins et al. | |
| 2010/0120128 A1 | 5/2010 | Liang | |

(Continued)

FOREIGN PATENT DOCUMENTS

AU    2008326248    9/2009

OTHER PUBLICATIONS

"Detailed California-Modified Greet Pathway for Conversion of Midwest Soybeans to Biodiesel (Fatty Acid Methyl Esters-FAME)," California Environmental Protection Agency, Air Resources Board, Stationary Source Division, Dec. 14, 2009, Version: 3.0, 65 pages.

(Continued)

*Primary Examiner* — James A Vezeris
(74) *Attorney, Agent, or Firm* — Proskauer Rose LLP

(57) ABSTRACT

A computerized method of using a data processor having a memory to account for carbon flows and determine a regulatory value for a biofuel includes (i) storing, in memory, a first set of one or more carbon flow values characterizing the production and use of a biofuel, wherein the biofuel is derived from a first fraction of an agricultural biomass, (ii) storing, in memory, a second set of one or more carbon flow values characterizing the sequestration of solid phase biomass carbon, wherein the solid phase biomass carbon is derived from a second fraction of the agricultural biomass and wherein the sequestration mitigates anthropogenic greenhouse gas emission, and (iii) calculating, using the data processor, a regulatory value for the biofuel from the first and second sets of carbon flow values.

34 Claims, 6 Drawing Sheets

(56) References Cited

U.S. PATENT DOCUMENTS

| | | |
|---|---|---|
| 2010/0145716 A1 | 6/2010 | Zeng |
| 2010/0198736 A1 | 8/2010 | Marino |
| 2010/0233789 A1 | 9/2010 | Rosenbaum |
| 2010/0279391 A1 | 11/2010 | Rosenbaum et al. |
| 2010/0331580 A1 | 12/2010 | Ridgley |
| 2011/0087578 A1 | 4/2011 | Finck et al. |

OTHER PUBLICATIONS

"Detailed California-Modified GREET Pathway for Corn Ethanol," California Environmental Protection Agency, Air Resources Board, Stationary Source Division, Feb. 27, 2009, Version: 2.1, 73 pages.

"Technology for Ethanol Production," Raizen, (available at http://www.raizen.com/en/segmento-de-negocios/etanol.aspx, last accessed on Aug. 24, 2011).

Gerfried Jungmeier, "The Impact of Energy Crop Cultivation in LCA of Transportation Biofuels," Bioenergy NoE Final Seminar, Nov. 2 and 3, 2009, Romarin Suite, Meridien Hotel, Brussels, pp. 1-23. (available at http://www.bioenergy-noe.com/Resources/user/Gerfried%20Jungmeier,%20JR%20-%20Impact%20of%20energy%20crop%20cultivation%20in-%20LCA%20of%20transportation%20biofuels.pdf, last accessed on Aug. 24, 2011).

Sacha Alberici and Carlo Hamelinck, "Annotated example of a GHG calculation using the EU Renewable Energy Directive Methodology," Sep. 30, 2010, Ecofys, 24 pages, (available at http://ec.europa.eu/energy/renewables/biofuels/doc/ecofys_report_annotated_example_actual_ghg_value.pdf, last accessed on Aug. 24, 2011).

"ISCC System Opportunities under EU recognition," 26 pages, (available at http://www.iscc-system.org/e865/e890/e954/e962/ISCC205GHGEmissionCalculationMethodologyandGHGAudit_eng.pdf, last accessed on Aug. 24, 2011).

"Fuels Guidance Documents," California Environmental Protection Agency, Air Resources Board, Reviewed Jun. 14, 2011, 148 pages, (available at http://www.arb.ca.gov/fuels/guidancedocs.htm, last accessed on Aug. 24, 2011).

"Register Your Biofuel Facility," California Environmental Protection Agency, Air Resources Board, May 20, 2011, 36 pages, (available at http://www.arb.ca.gov/fuels/lcfs/reportingtool/biofuelregistration.htm, last accessed on Aug. 24, 2011).

"Bio-energy with carbon capture and storage," Wikipedia, pp. 1-6, (available at http://en.wikipedia.org/wiki/Bio-energy_with_carbon_capture_and storage, last accessed on Aug. 24, 2011).

"Biochar," Wikipedia, pp. 1-11, (available at http://en.wikipedia.org/wiki/Biochar, last accessed on Aug. 24, 2011).

Stuart E. Strand and Gregory Benford, "Ocean Sequestration of Crop Residue Carbon: Recycling Fossil Fuel Carbon Back to Deep Sediments," Environ. Sci. Technol., 2009, 43, pp. 1000-1007, (available at http://www.physics.uci.edu/faculty/2009-Ocean-Sequestr-CROPS.pdf, last accessed on Aug. 24, 2011).

"Carbon sequestration," Wikipedia, pp. 1-13, (available at http://en.wikipedia.org/wiki/Carbon_sequestration, last accessed on Aug. 24, 2011).

Leon Clarke, Kate Calvin, James A. Edmonds, Page Kyle, and Marshall Wise, "Technology and International Climate Policy," Dec. 2008, Discussion Paper 08-21, The Harvard Project on International Climate Agreements, 37 pages, (available at http://belfercenter.ksg.harvard.edu/publication/18678/technology_and_international_climate_policy.html, last accessed on Aug. 24, 2011).

"Carbon Emissions: CO2 could sink without trace by 2100," International Institute for Applied Systems Analysis (IIASA), 3 pages, (available at http://www.iiasa.ac.at/Admin/INF/feature_articles/Options/2010/November/co2_sink.html, last accessed on Aug. 24, 2011).

P. Luckow, J.J. Dooley, M.A. Wise, and S.H. Kim, "Biomass Energy for Transport and Electricity: Large Scale Utilization Under Low CO2 Concentration Scenarios," Pacific Northwest National Laboratory, U.S. Department of Energy, Jan. 2010, 28 pages, (available at http://www.pnl.gov/main/publications/external/technical_reports/PNNL-19124.pdf, last accessed on Aug. 24, 2011).

"The Status of CSS Projects Interim Report 2010," Archer Daniels Midland Company Ethanol Plant Industrial CCS, 9 pages, (available at http://www.globalccsinstitute.com/resources/projects/archer-daniels-midland-company-ethanol-plant-industrial-ccs, last accessed on Aug. 24, 2011).

R.T. Dahowski and J.J. Dooley, "Source/Sink Matching for U.S. Ethanol Plants and Candidate Deep Geologic Carbon Dioxide Storage Formations," Pacific Northwest National Laboratory, U.S. Department of Energy, Sep. 2008, 9 pages, (available at http://www.pnl.gov/main/publications/external/technical_reports/PNNL-17831.pdf, last accessed on Aug. 24, 2011).

"BioFuels," IEAViews, pp. 1-3, (available at http://www.ieaorg/journalists/infocus.asp, last accessed on Aug. 24, 2011).

"Technology Roadmap: Carbon capture and storage," International Energy Agency, 52 pages, (available at http://www.iea.org/papers/2009/CCS_Roadmap.pdf, last accessed on Aug. 24, 2011).

Kenneth Möllersten, Jinyue Yan, and Jose R. Moreira "Potential market niches for biomass energy with CO2 capture and storage—Opportunities for energy supply with negative CO2 emissions," Original Research Article, Biomass and Bioenergy, vol. 25, Issue 3, Sep. 2003, pp. 273-285. (available at http://www.sciencedirect.com/science?_ob=ArticleURL&_udi=B6V22-487MW98-1&_user=10&_coverDate=09/30/2003&_rdoc=1&fmt=high&_orig=search&_origin=search&_sort=d&_docanchor=&view=c&_acct=C000050221&_version=1&_urlVersion=0&_userid=10&md5=7ac388b4a4c8b24fe2edc33566a3e2bb&sea rchtype=a, last accessed on Aug. 24, 2011).

"Carbondioxide Capture and Storage in the Clean Development Mechanism: Assessing Market Effects of Inclusion," Report No. 2008/13, Nov. 2008, 109 pages, (available at http://www.ieaghg.org/docs/general_publications/2008_13.pdf, last accessed on Aug. 24, 2011).

"Table 6. Carbon Intensity Lookup Table for Gasoline and Fuels that Substitute for Gasoline," Jan. 6, 2011, 8 pages. (available at http://www.arb.ca.gov/fuels/lcfs/010611lcfs_lutables.pdf, last accessed on Aug. 24, 2011).

"LCFS Workgroups," California Environmental Protection Agency, Air Resources Board, Jul. 1, 2011, 2 pages, (available at http://www.arb.ca.gov/fuels/lcfs/workgroups/workgroups.htm#pathways, last accessed on Aug. 24, 2011).

"Carbon Intensities (CIs) and Other Information from Registered Biofuel Facilities," California Environmental Protection Agency, Air Resources Board, May 27, 2011 4 pages, (available at http://www.arb.ca.gov/fuels/lcfs/reportingtool/registeredfacilityinfo.htm, last accessed on Aug. 24, 2011).

Ning Zeng, "Carbon Sequestration Via Wood Burial," Carbon Balance and Management, Jan. 3, 2008, 3:1, pp. 1-12.

Thomas Garrett and William Walker, "An Investigation Into the Carbon Storage Potential of Pinus Radiata Wood Processing Residue for Carbon Credits," Solid Energy, University of Canterbury, Oct. 5, 2009, pp. 1-62.

Adair et al., "The Effect of Wood Burial and Submersion on Decomposition: Implications for Reducing Carbon Emissions," 2010, 140 pages.

"Biochar Pathways for Different Environments," International Biochar Initiative, Aug. 26, 2009, 2 pages.

James S. Rhodes and David W. Keith, "Biomass With Capture: Negative Emissions Within Social and Environmental Constraints: and Editorial Comment," Climate Change, Doi 10.1007/S10584-9387-4, 8 pages.

David W. Keith and James S. Rhodes, Bury, Burn or Both: A Two-For-One Deal on Biomass Carbon and Energy: Reply to R.A. Metzger, G. Benford, and M.I. Hoffert, Climatic Change 54: 375-377, 2002.

"Dump Corn Stalks At Sea to Slow Global Warming?" The Christian Science Monitor, Feb. 11, 2009, 3 pages.

"An Introduction to Biochar: Concept, Processes, Properties, and Applications," Powerpoint Presentation of Jim Amonette, Pacific Northwest National Laboratory (Pnnl) on Jan. 25, 2009, 26 pages.

"Carbon Sequestration Opportunities with Biofuel Production," Powerpoint Presentation by Jim Amonette, Pacific Northwest National Laboratory (Pnnl) on Nov. 6, 2007, 24 pages (available at

(56) References Cited

OTHER PUBLICATIONS http://www.bioeconomyconference.org/07%20Sessions/approved07sessions/Amonette,%20Jim.pdf, last accessed on Aug. 25, 2011).

Jansson et al., "Phytosequestration: Carbon Biosequestration by Plants and the Prospects of Genetic Engineering," BioScience, Oct. 2010, vol. 60. No. 9 pp. 685-696, (available at http://www.aibs.org/bioscience-press-releases/resources/Jansson%20et%20al.pdf, last accessed on Aug. 25, 2011).

Johannes Lehmann, "A handful of carbon," Nature, vol. 447, No. 10, May 2007, pp. 143-144, (available at http://www.css.cornell.edu/faculty/lehmann/publ/Nature%20447,%20143-144,%202007%20Lehmann.pdf, last accessed on Aug. 25, 2011).

Johannes Lehmann, "Bio-energy in black," Front Ecol Environ, 2007, vol. 7. No. 7 pp. 381-387, (available at http://wiki.nscss.org/system/files/Lehmann2007.pdf, last accessed on Aug. 25, 2011).

Keil et al., "Burial of agricultural byproducts in the deep sea as a form of carbon sequestration: a preliminary experiment," Marine Chemistry vol. 122, 2010, pp. 91-95, (available at http://depts.washington.edu/aog/publications/Keiletal2010MarChem.pdf, last accessed on Aug. 25, 2011).

Keil et al., "Burial of Agricultural Byproducts in the Deep Sea as a form of Carbon Sequestration" (Draft) (available at http://depts.washington.edu/aog/publications/Crops_manuscript_RKv5DRAFT.pdf, last accessed on Aug. 25, 2011).

"Hydrothermal carbonization (HTC): simply impressive", AVA-CO2 Schweiz AG, 2011, 13 pages, (available at http://www.ava-co2.com/web/pages/en/technology.php, last accessed on Aug. 25, 2011).

"Innovative Team Builds a Worldwide Novelty," Carbon Solutions—Hydrothermale Carbonisierung, 7 pages, (available at http://www.cs-carbonsolutions.de/htc-process.htm, last accessed on Aug. 25, 2011).

"Torrefaction," Biomass + Microwave Technology = BioCoal, 1 page, (available at http://canadian-biocoal.com/, last accessed on Aug. 25, 2011).

"Torrefaction," Wikipedia, 4 pages, (available at http://en.wikipedia.org/wiki/Torrefaction, last accessed on Aug. 25, 2011).

"The Case for Energy Densification of Biomass & the Advantage of the Rotawave Ties System," Rotawave Ltd., 4 pages, (available at http://canadian-biocoal.com/articles/Rotawave%20TIES%20system%20advantage%20Jun%202-010%20_final_.pdf, last accessed on Aug. 25, 2011).

Florentinus, et al., "Worldwide Potential of Aquatic Biomass: Report Summary" ECOFYS, Jan.-May 2008, 11 pages, (available at http://www.ecofys.com/com/publications/brochures_newsletters/documents/worldwide_potential_aquatic_biomass_summary.pdf, last accessed on Aug. 25, 2011).

"Algae Based Co2 Capture—Live Projects," (Abstract), 1 page (available at http://www.powerplantccs.com/ccs/cap/fut/alg/alg_ccs_liveprojects.html, last accessed on Aug. 25, 2011).

"Algae based CO2 Capture," 1 page (available at http://www.powerplantccs.com/ccs/cap/fut/alg/alg.html, last accessed on Aug. 25, 2011).

"Comprehensive Guide for Algae-based CO2 Capture: The most comprehensive and detailed guide for the technology, processes and opportunities in the algae-based CO2 industry," (available at http://www.oilgae.com/ref/report/co2_capture/co2_capture.html, last accessed on Aug. 25, 2011).

Rooney et al., "Designing sorghum as a dedicated bioenergy feedstock," (Abstract) Biofuels, Bioproducts and Biorefining, vol. 1, Issue 2, pp. 147-157, Sep. 18, 2007 (available at http://onlinelibrary.wiley.com/doi/10.1002/bbb.15/abstract, last accessed on Aug. 25, 2011).

Mani et al., "Modeling of the Wet Storage of Biomass," American Society of Agricultural and Biological Engineers, Paper No. 061014, 2006 ASAE Annual Meeting 2006 (available at http://asae.fiymulti.com/abstract.asp?aid=21443&t=1, last accessed on Aug. 25, 2011).

Kaliyan et al., "Roll Press Briquetting and Pelleting of Corn Stover and Switchgrass," Transactions of the ASABE. 52(2): 543-555, 2009 American Society of Agricultural and Biological Engineers (available at http://asae.frymulti.com/abstract.asp?aid=26812&t=1, last accessed on Aug. 25, 2011).

"Pre-treatment of Biomass," Pre-treatment of Biomass—Power Plant CCS, 1 page, (available at http://powerplantccs.com/ccs/cap/fut/bio/pre_treatment.html, last accessed on Aug. 25, 2011).

"Biofuel Beedstock Logistics: Recommendations for Research and Commercialization: A Report by the Feedstock Logistics Interagency Working Group," Nov. 2010, pp. 1-52, (available at http://www.usbiomassboard.gov/pdfs/biomass_logistics_2011_web.pdf, last accessed on Aug. 25, 2011).

Afzal et al., "Storage of Comminuted and Uncomminuted Forest Biomass and its Effect on Fuel Quality," Bioresources vol. 5 No. 1, pp. 55-69, (available at http://ojs.cnr.ncsu.edu/index.php/BioRes/article/view/BioRes_05_1_0055_Afzal_BSM_Storage_Comminuted_Biomass/487, last accessed on Aug. 25, 2011).

"Advancing a Biological Paradigm for Biomass Pretreatment," Powerpoint Presentation of Richard et al., 14 pages (available at http://openwetware.org/images/c/c6/IBE_2007_Richard.pdf, last accessed on Aug. 25, 2011).

"Classification and Application of Biomass Physical Properties in Harvesting and Preprocessing Systems", DOE/USDA Biomass Feedstock, Gate Review Meeting, Mar. 15, 2005, Powerpoint Presentation by Chris Wright, (available at http://feedstockreview.ornl.gov/pdf/wright/session3_wright.pdf, last accessed on Aug. 25, 2011).

"Post Harvest Physiology of Biomass Storage," DOE/USDA Biomass Feedstock, Gate Review Meeting, Mar. 16, 2005, Powerpoint Presentation by Corey W. Radtke, Idaho National Laboratory, (available at http://feedstockreview.ornl.gov/pdf/radtke/session4_radtke.pdf, last accessed on Aug. 25, 2011).

"Energy Densification via Hydrothermal Pre-Treatment of Cellulosic Biomass," AWMA International Specialty Conference: Leapfrogging Opportunities for Air Quality Improvement, May 10-14, 2010, Powerpoint Presentation by Hoekman et al., (available at http://www.dri.edu/images/stories/editors/leapfrog/techprog/Vg_1_Hoekman.pdf, last accessed on Aug. 25, 2011).

Hess et al., "Uniform-Format Bioenergy Feedstock Supply System Design Report Series," vol. A: "Uniform-Format" Vision and Conventional-Bale Supply System Design (DRAFT) Apr. 2009, p. 1-204 (available at https://inlportal.inl.gov/portal/server.pt/gateway/PTARGS_0_1829_63075_0_0_18/Uniform-Format_Feedstock_Revised_Draft.pdf, last accessed on Aug. 25, 2011).

Gnansounou, E., et al., "Life Cycle assessment of biofuels: Energy and greenhouse gas balances," Bioresource Technology 100, pp. 4919-4930, 2009.

International Search Report for PCT/US2011/045578, mailed Apr. 12, 2012, 4 pages.

International Search Report for PCT/US2011/045580, mailed Apr. 19, 2012, 4 pages.

"Biofuels Update: Highlands Envirofuels Gets Permit for Ethanol Production Plant," Sep. 29, 2011, 1 page.

International Search Report for PCT/US 2012/034719, mailed Jul. 18, 2012, 3 pages.

Rhodes, "Carbon mitigation with biomass: An engineering, economic and policy assessment of opportunities and implications," Carnegie Mellon University Carnegie Institute of Technology, Thesis, 2007, 75 pages.

* cited by examiner

US 8,600,865 B2

SOLID PHASE BIOMASS CARBON STORAGE (SPBCS)

CROSS REFERENCE TO RELATED APPLICATIONS

This application claims benefit of priority to U.S. Ser. No. 13/192,182 filed on Jul. 27, 2011 and claims benefit of priority to U.S. Ser. No. 61/374,953, filed on Aug. 18, 2010, the disclosure of which is incorporated herein by reference in its entirety.

FIELD OF THE TECHNOLOGY

The invention relates generally to biofuel production. The invention relates more particularly to methods of accounting for carbon flows and determining a regulatory value for a biofuel, methods of engineering carbon cycles for biofuel production, and methods of manufacturing biofuels, as well as the biofuels and regulatory values derived therefrom.

BACKGROND OF THE INVENTION

Carbon intensity (CI) is a fuel characteristic that is increasingly being measured and regulated in various jurisdictions within the U.S. and abroad (e.g., U.S. RFS2; LCFS in CA, BC, WA, OR, NEMA; EU-RED; UK-RTFO). CI can be used as a measure of net greenhouse gas emissions from across the fuel life cycle generally evaluated using lifecycle analysis (LCA) methods and specified per unit fuel energy, e.g., in units of gram CO2 equivalent emissions per mega-joule of fuel (gCO2e/MJ). For biofuels, carbon intensity measures can include emissions from sources associated with supplying inputs for agricultural production (e.g., fertilizers), fuel combustion, and certain or all process steps in between, which may be used to define a fuel production pathway, or simply a fuel pathway. LCA of carbon intensity can be set up as an accounting system with emissions to the atmosphere (e.g., combustion emissions) representing LCA accounting debits and flows from the atmosphere (e.g., carbon fixed from the atmosphere via photosynthesis) representing LCA accounting credits. The sign convention can be reversed relative to financial accounting, but this is how the terms are often used in practice.

SUMMARY OF THE INVENTION

LCA methods can be used to assess a variety of social and environmental performance characteristics of biofuels, which can collectively be referred to using the term sustainability. Biofuel sustainability characteristics or sustainability performance can be reflected within biofuel and related policy instruments (e.g., as a quantitative value associated with, or characterizing, the biofuel, as well as related standards), to provide a framework for avoiding potential negative consequences of expanding biofuel production.

The effects of biomass carbon that is not converted into biofuel or other products (e.g., agricultural and biofuel production residues) can be reflected in evaluations of biofuel/product performance against sustainability metrics in methods similar to those used for carbon intensity measures. In other words, LCA can reflect emissions credits and debits accrued across the whole fuel production pathway or supply chain, including emissions effects of biomass carbon not converted into useful products. This can be accomplished by providing a lifecycle emissions accounting credit to the product of interest based on allocation of a fraction of lifecycle emissions (generally emissions associated with processes upstream of the material diversion for co-product/by-product use) to the various products (according to so called "allocation" accounting methodologies) or by providing lifecycle emissions accounting credits (or debits) for net emissions reductions (or increases) associated with use of the various co-products/by-products relative to use of more conventional products (according to so called "system expansion" accounting methodology).

Solid phase biomass carbon storage (SPBCS) provides systems, methods, and processes for sequestering solid phase carbon in biomass away from the atmosphere for time periods appropriate for mitigating anthropogenic greenhouse gas emissions. The biomass could remain in the SPBCS storage systems indefinitely, or could be reprocessed into products that provide continued sequestration benefits (e.g., building materials), into energy products with continued carbon sequestration benefits via CO2 capture and storage (CCS), or into energy products without CCS with emissions benefits from bio-energy substitution for conventional products (e.g., from fossil fuels), but at the expense of carbon sequestration benefits. In the latter scenario, climate benefits associated with deferred emissions would still be realized. Thus, SPBCS enables present realization of carbon benefits associated with biomass materials, specifically benefits associated with preventing the degradation of such materials, which would result in the release of biomass carbon to the atmosphere as greenhouse gases, and potential future realization of potential chemical or energy benefits of sequestered biomass carbon. SPBCS also operates within the context of various regulatory systems, enabling the environmental benefits to be quantified and associated with a biofuel or a tradable credit. Such tradable credits can be distinct from LCA accounting credits, in that they may be specifically traded (bought or sold) under certain regulatory frameworks. Thus, SPBCS also can provide an economic incentive, which would not have existed prior to the implementation of such regulatory systems, for affecting environmental objectives.

In one aspect, the invention provides a computerized method of using a data processor having a memory to account for carbon flows and determine a regulatory value for a biofuel. The method includes (i) storing, in memory, a first set of one or more values characterizing carbon flows associated with the production and use of a biofuel, wherein the biofuel is derived from a first fraction of an agricultural biomass, (ii) storing, in memory, a second set of one or more values characterizing carbon flows associated with the sequestration of solid phase biomass carbon, wherein the solid phase biomass carbon is derived from a second fraction of the agricultural biomass and wherein the sequestration mitigates anthropogenic greenhouse gas emission, and (iii) calculating, using the data processor, a regulatory value for the biofuel from the first and second sets of carbon flow values.

In another aspect, the invention provides a method of engineering a carbon cycle for biofuel production and use. The method includes (i) arranging the production of a biofuel from a first fraction of an agricultural biomass and the sequestration of solid phase biomass carbon from a second fraction of the agricultural biomass, which mitigates anthropogenic greenhouse gas emission and (ii) assigning a regulatory value to the biofuel from a first set of one or more carbon intensity values characterizing the production and use of the biofuel, and a second set of one or more carbon intensity value characterizing the carbon sequestration.

In yet another aspect, the invention provides a method of manufacturing a biofuel. The method includes (i) producing a biofuel from a first fraction of agricultural biomass, (ii)

sequestering solid phase biomass carbon from a second fraction of the agricultural biomass, wherein sequestration mitigates anthropogenic greenhouse gas emission, and (iii) assigning a biofuel a regulatory value based upon a first set of one or more carbon intensity values characterizing the production and use of the biofuel and a second set of one or more carbon intensity value characterizing the sequestration.

In still another aspect, the invention provides a computerized method of using a data processor having a memory to account for carbon flows and determine a regulatory value for a biofuel. The method includes (i) storing, in memory, a first set of one or more carbon flow values characterizing the production and use of a biofuel, wherein the biofuel is derived from a first fraction of an agricultural biomass, (ii) storing, in memory, a second set of one or more carbon flow values characterizing the sequestration of solid phase biomass carbon, wherein the solid phase biomass carbon is derived from a second fraction of the agricultural biomass including agricultural residue and wherein the sequestration mitigates anthropogenic greenhouse gas emission, (iii) calculating, using the data processor, a regulatory value for the biofuel from the first and second sets of carbon flow values, and (iv) trading the biofuel having the regulatory value, a tradable credit generated as a function of the regulatory value, or both the biofuel and the tradable credit. The sequestration includes processing to mitigate degradation of the solid phase biomass carbon and storing the solid phase biomass carbon to mitigate environmental interaction.

In still another embodiment, the invention provides a method of engineering a carbon cycle for biofuel production and use. The method includes (i) arranging the production of a biofuel from a first fraction of an agricultural biomass and the sequestration of solid phase biomass carbon from a second fraction of the agricultural biomass including agricultural residue, thereby mitigating anthropogenic greenhouse gas emission, (ii) assigning a regulatory value to the biofuel from a first set of one or more carbon intensity values characterizing the production and use of the biofuel, and a second set of one or more carbon intensity value characterizing the sequestration, and (iii) trading the biofuel having the regulatory value, a tradable credit generated as a function of the regulatory value, or both the biofuel and the tradable credit. The sequestration includes processing to mitigate degradation of the solid phase biomass carbon and storing the solid phase biomass carbon to mitigate environmental interaction.

In still another embodiment, the invention provides a method of manufacturing a biofuel. The method includes (i) producing a biofuel from a first fraction of an agricultural biomass, (ii) sequestering solid phase biomass carbon from a second fraction of the agricultural biomass including agricultural residue, wherein sequestration mitigates anthropogenic greenhouse gas emission, (iii) assigning the biofuel a regulatory value based upon a first set of one or more carbon intensity values characterizing the production and use of the biofuel and a second set of one or more carbon intensity value characterizing the sequestration, and (iv) trading the biofuel having the regulatory value, a tradable credit generated as a function of the regulatory value, or both the biofuel and the tradable credit. The sequestration includes processing to mitigate degradation of the solid phase biomass carbon and storing the solid phase biomass carbon to mitigate environmental interaction.

In still another aspect, the invention provides a method including (i) receiving a biofuel feedstock produced from a first fraction of an agricultural biomass, wherein the biofuel feedstock has associated sequestered solid phase biomass carbon, wherein the solid phase biomass carbon is derived from a second fraction of the agricultural biomass and wherein the sequestration mitigates anthropogenic greenhouse gas emission and (ii) producing a low carbon fuel derived from the biofuel feedstock, wherein the low-carbon fuel comprises a transportation fuel having a LCA carbon emissions accounting credit based at least in part on a fuel pathway comprising the sequestration of the solid phase biomass carbon.

In still another aspect, the invention provides a method including (i) receiving a biofuel produced from a first fraction of an agricultural biomass, wherein the biofuel has associated sequestered solid phase biomass carbon, wherein the solid phase biomass carbon is derived from a second fraction of the agricultural biomass and wherein the sequestration mitigates anthropogenic greenhouse gas emission and (ii) providing the biofuel as a low carbon biofuel, wherein the low-carbon biofuel comprises a transportation fuel having a LCA carbon emissions accounting credit based at least in part on a fuel pathway comprising the sequestration of the solid phase biomass carbon.

In still another aspect, the invention provides a method of sequestering biomass produced within a biofuel supply chain, but not converted into a biofuel, to reduce anthropogenic greenhouse gas emissions, such that resulting reductions in anthropogenic greenhouse emissions can be assigned to the biofuel supply chain or biofuel produced in the biofuel supply chain.

In still another aspect, the invention provides a method of providing a biofuel having a reduced carbon intensity value by (i) purchasing a biofuel produced from a first fraction of biomass, wherein the biofuel has associated sequestered solid phase biomass carbon, wherein the solid phase biomass carbon is derived from a second fraction of the agricultural biomass and wherein the sequestration mitigates anthropogenic greenhouse gas emission, (ii) assigning a carbon intensity value that reflects a LCA emissions accounting credit for mitigating anthropogenic greenhouse gas emissions, and (iii) selling at least one of the biofuel and a tradable credit defined as a function of the carbon intensity value.

In still another aspect, the invention provides a method of providing a biofuel having a reduced carbon intensity value by (i) purchasing feedstock for biofuel production that represents a first fraction of an agricultural biomass, wherein the biofuel has associated sequestered solid phase biomass carbon, wherein the solid phase biomass carbon is derived from a second fraction of the agricultural biomass and wherein the sequestration mitigates anthropogenic greenhouse gas emission, (ii) assigning a carbon intensity value that reflects a LCA emissions accounting credit for mitigating anthropogenic greenhouse gas emissions, and (iii) and selling at least one of the biofuel and tradable credit defined as a function of the carbon intensity value.

In still another aspect, the invention provides for biofuels, sequestered solid phase biomass, and/or tradable credits produced according to any of the methods of the invention.

In various embodiments, the sequestration includes processing to mitigate degradation of the solid phase biomass carbon. The processing can include one or more of collection, drying, resizing, sterilization, stabilization, packaging, and sealing.

In some embodiments, the sequestration includes storing the solid phase biomass carbon to mitigate environmental interaction.

In certain embodiments, the method also includes monitoring carbon flow from the sequestered solid phase biomass carbon.

In various embodiments, the method also includes repurposing the sequestered solid phase biomass carbon.

In some embodiments, the method also includes trading the biofuel having the regulatory value, a tradable credit generated as a function of the regulatory value, or both the biofuel and the tradable credit. A method can include completing a transaction to sell a low carbon fuel to a transportation fuel provider.

In certain embodiments, the second fraction includes an agricultural residue.

In various embodiments, the greenhouse gas emission comprises carbon emission. In general, greenhouse gas can include any one or more gasses that in the atmosphere absorbs and emits radiation within the thermal infrared range. Greenhouse gas emission can include, for example, the emission of any one or more of: carbon dioxide, methane, nitrous oxide, and ozone.

It is understood by those skilled in the art that the various aspects and features described herein can be adapted and combined with the various embodiments of the invention. The advantages of the technology described above, together with further advantages, may be better understood by referring to the following description taken in conjunction with the accompanying drawings. The drawings are not necessarily to scale, emphasis instead generally being placed upon illustrating the principles of the technology.

Figure 1:
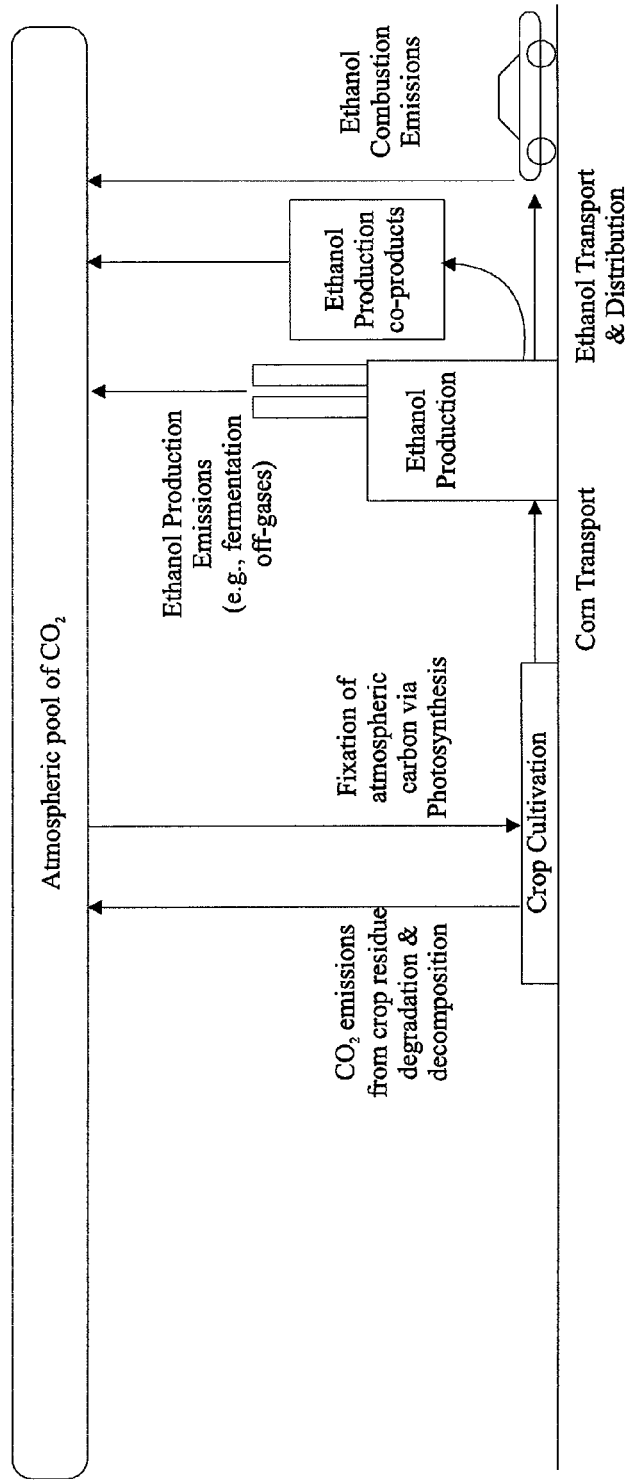
FIGS. 1-4 show biogenic carbon flows in different examples of the production and use of corn ethanol.

The invention will now be described in detail with respect to the preferred embodiments and the best mode in which to make and use the invention. Those skilled in the art will recognize that the embodiments described are capable of being modified and altered without departing from the teachings herein.

DETAILED DESCRIPTION OF THE INVETION

SPBCS enables present realization of environmental benefits associated with the reduction of greenhouse gas emissions in biofuel carbon cycles. For example, SPBCS can mitigate anthropogenic greenhouse gas (GHG) emissions by providing for biofuels that have a lower carbon intensity than conventional biofuels and/or conventional fossil hydrocarbon fuels. Additionally, SPBCS operates within the context of various regulatory systems, enabling the environmental benefits to be quantified and associated with a biofuel or a tradable credit. Thus, SPBCS can also help provide an economic incentive for providing environmental benefits.

SPBCS represents a unique alternative and an advance when compared to other approaches to mitigating anthropogenic greenhouse gas emission, including production of low carbon fuels and carbon sequestration. For example, carbon capture and storage (CCS) represents a set of technologies capable of concentrating, compressing, transporting (as necessary), and sequestering $CO_2$ (e.g., from industrial processes) away from the atmosphere (e.g., in geologic formations). SPBCS differs from CCS, for example, in that SPBCS involves sequestration of solid phase biomass carbon, not $CO_2$. SPBCS also differs from other approaches for sequestering carbon (e.g., (i) application of biochar as a soil amendment to increase soil carbon storage and soil fertility and (ii) sinking raw biomass in river deltas where it would be buried in the sediments of alluvial fans). SPBCS differs from such approaches, for example, because SPBCS can include processing and/or controlled storage and/or use of the solid phase biomass carbon to limit its degradation and enable ongoing measurement and verification of associated climate benefits. SPBCS further differs from such approaches in its direct association via biomass production of (i) biofuels produced from a first fraction of biomass (biofuel feedstock) and (ii) sequestration of biomass carbon from a second fraction of biomass that is produced as a consequence of biofuel feedstock production. This direct association enables crediting emissions and other sustainability benefits resulting from the sequestered biomass carbon to the biofuel produced, yielding biofuel products with reduced carbon intensity and/or improved performance against sustainability measures.

Processing and/or storage can control and/or mitigate interaction between the solid phase biomass carbon and environmental factors (e.g., heat, light, air, water, animals, insects, fungi, bacteria, and the like), which can contribute to the release of GHG from the biomass into the atmosphere. Thus, SPBCS can help protect the environment from the various climate risks associated with the release of GHG. SPBCS can also help protect the environment from the various risks associated with other carbon sequestration methods (e.g., prevent the potential mobilization of stored carbon, for example, by siltation or sedimentation of surface water bodies from water induced bio-char mobilization).

Moreover, SPBCS has the advantage that the stored carbon can be removed from storage and repurposed, for example, when it can be used in products or services that continue to prevent atmospheric releases of stored carbon (e.g., building materials or energy systems with CCS), that otherwise continue to provide climate benefits, when development of other technologies lessens the climate risks associated with atmospheric release of stored carbon (e.g., capture of $CO_2$ directly from the atmosphere), and/or when climate risks are determined to have been otherwise resolved.

In one aspect, SPBCS provides a method of account for carbon flows and determination of a regulatory value for a biofuel. The method includes (i) storing a first set of one or more values characterizing carbon and/or GHG flows associated with the production and use of a biofuel, wherein the biofuel is derived from a first fraction of an agricultural biomass, (ii) storing a second set of one or more values characterizing carbon and/or GHG flows associated with the sequestration of solid phase biomass carbon, wherein the solid phase biomass carbon is derived from a second fraction of the agricultural biomass and wherein the sequestration mitigates anthropogenic greenhouse gas emission, and (iii) calculating a regulatory value for the biofuel from the first and second sets of carbon flow values. The accounting can be implemented, in whole or in part, by hand and/or by essentially any data processing device, including a personal computer, an electronic device such as a smartphone or tablet, a customized or purpose-built machine, and the like.

In another aspect, SPBCS features a method of engineering a carbon cycle for biofuel production and use. The method includes (i) arranging the production of a biofuel from a first fraction of an agricultural biomass and the sequestration of solid phase biomass carbon from a second fraction of the agricultural biomass, thereby mitigating anthropogenic greenhouse gas emission and (ii) assigning a regulatory value to the biofuel from a first set of one or more carbon intensity values characterizing the production and use of the biofuel, and a second set of one or more carbon intensity value characterizing the sequestration.

In yet another aspect, SPBCS features a method of manufacturing a biofuel. The method includes (i) producing a biofuel from a first fraction of an agricultural biomass, (ii) sequestering solid phase biomass carbon from a second fraction of the agricultural biomass, wherein sequestration mitigates anthropogenic greenhouse gas emission, and (iii) assigning the biofuel a regulatory value based upon a first set of one or more carbon intensity values characterizing the production and use of the biofuel and a second set of one or more carbon intensity value characterizing the sequestration.

Although SPBCS relates to an entire biofuel carbon cycle, it can be carried out by a single entity executing, arranging for and/or providing for the execution of the individual steps. For example, the single entity can contract for the completion of one or more individual steps (e.g., agricultural production, biofuel production, sequestration of solid phase biomass carbon, agricultural residue utilization, and/or greenhouse gas accounting and/or sustainability assessment). In some embodiments, the single entity might employ a preexisting framework or registration in carrying out the method (e.g., purchase a biofuel feedstock with an established CI and/or sustainability measure reflecting SPBCS, or produce a biofuel with an established CI and/or sustainability measure reflecting SPBCS) rather than ascertaining values for components of the pathway from scratch. Therefore, although the method integrates a wide variety of features from a long and complex supply chain/carbon cycle, the method is readily implemented by a single entity.

In the context of SPBCS, biomass includes materials derived from biological processes including, but not limited to: photosynthesis; consumption of photosynthetically produced biomass, such as biomass of heterotrophic organisms, waste products or residues from heterotrophic organisms; or products, byproducts, or residues resulting from industrial processing of biomass. For illustrative purposes, the detailed description of the invention will use an example of agricultural residues resulting from corn production, commonly referred to as corn stover. Corn stover results from corn production in general, but is particularly relevant in the context of ethanol production from corn, as emissions associated with the degradation of this corn stover are or may be treated differently than corn stover from other sources within particular regulatory contexts (e.g., the California Low Carbon Fuel Standards and federal Renewable Fuels Standard). The use of this example for illustrative purposes in no way limits the applicability of this invention to corn stover produced in this supply chain, agricultural residues resulting from biofuel production or to agricultural residues as a class of biomass. A person of ordinary skill in the art can readily apply the example provided to biofuel production from many other feedstock sources, including for example: sugar cane; wheat; sugar beets; soybeans; canola; camolina; and the like.

In various embodiments, other classes of agricultural biomass can include, for example: agricultural residues from production of other biofuel feedstock types; forestry residues; biomass from land clearing activities; clippings from landscaping or property maintenance (public or private); animal solid wastes (e.g., manures); aquatic plant solids; industrial biomass solid residues (e.g., mill wastes, sugar cane bagasse, residues from starch or cellulosic biofuels production, lipid-extracted algae, anaerobic digestor solids, etc.); or biomass produced or harvested specifically for SPBCS (e.g., perennial grasses).

In general, a first fraction of the biomass can be a fraction of the biomass that is used as a biofuel feedstock (e.g., lipid and/or carbohydrate rich fraction in the example of a first generation biofuel). In general, the second fraction of the biomass can be a fraction of the biomass that is not used as a biofuel feedstock (though, in some embodiments, the second fraction can also be a biofuel feedstock, e.g., for a cellulosic biofuel). In various embodiments, the second fraction is or comprises an agricultural residue. The term agricultural residues is used here to describe biomass produced in agriculture, silviculture, and or aquaculture systems that is typically or historically not of sufficient value to be converted into salable product(s) and is therefore historically allowed to decompose in natural or modified environments (e.g., in the field, in compost, etc.), burned, or used as fodder or bedding in animal husbandry. Agricultural residues can be separated from the primary biofuel feedstock during harvesting (e.g., stalks, stems, leaves, etc.) or in post-harvest processing (e.g., shells, pods, hulls, etc.). In some embodiments, the first fraction of biomass may not be used for biofuel production, may not be used for any purpose, or may represent 0% of the total available biomass. In these embodiments emissions and sustainability benefits may be credited to the activity yielding the biomass, to the party arranging for the biomass carbon sequestration, or to other parties contracting to receive the credit. Activities yielding the biomass may include, for example, production of conventional agricultural commodities (e.g., of food, feed, and/or fiber products), timber production, land clearing activities, or other associated activities (e.g., biofuels production indirectly yielding land clearing activities via price signals on conventional agricultural products)

In general, sequestration mitigates anthropogenic greenhouse gas emission. Sequestration can include any one or more of various transportation, processing, and storage steps. Storage can include monitoring. Sequestration can also include repurposing (e.g., production of building materials from the biomass, or bio-energy product substitution for fossil fuel energy products), for example, where the repurposing mitigates anthropogenic carbon emissions (e.g., building materials sequester a significant fraction of the biomass carbon on an environmentally relevant timescale, substitution of bio-energy products reduces GHG emission from fossil carbon sources).

Sequestration can include, solely for explanatory purposes, any one or more of the following steps. However, the number, order, combination, and character of steps will be context specific and depend on a number of factors, including, for example, biomass type, physical characteristics (e.g., moisture content), chemical characteristics (e.g., volatiles content), dependencies with alternate implementations of the other principle steps, regulatory factors and requirements (e.g., regulations specific to particular materials, and monitoring requirements), and market considerations (e.g., factor prices, assurances, insurance requirements or dependencies). These general steps can include any one or more of: Biomass collection, Drying, Resizing, Sterilization, Stabilization, Packaging, Sealing, Storage, Monitoring, and Repurposing. Each of these steps is discussed below. Note, however, that the applicability and character of these steps will be context dependent. In certain applications or for certain purposes one or more step may be eliminated, combined, disaggregated into or across multiple stages or processes, ordered differently, accomplished at multiple locations with one or more intermediate transport steps, or integrated into other processes.

Biomass collection includes the process(es) by which available biomass is aggregated and made available for SPBCS. One example of a potential biomass collection system can affect: biomass collection from a field and transport to the field edge with mechanized farm implements; subsequent biomass transport from the field edge to a local storage site via truck; and subsequent transport to a centralized SPBCS processing facility via truck. Alternatively, SPBCS processing steps can be accomplished locally in the field, at the field edge, or at a local storage site.

Biomass drying includes the process(es) by which moisture is removed from the biomass. Biomass drying can support SPBCS implementation by reducing the mass to be transported, processed, and/or stored. Drying can enable downstream processing steps, depending on the particular implementation options selected for those steps. Biomass drying can also reduce the potential for biological activity and associated degradation of the biomass, which releases biomass carbon to the atmosphere. In certain embodiments, drying can be unnecessary, depending on the specific implementation options selected for other processing steps and storage. Many technologies can be used for drying biomass, including, for example, air drying before collection in the field, air drying after collection at distributed local or centralized facilities, solar drying systems, and combustion-heated systems.

Resizing includes the process(es) by which the physical dimensions of biomass are altered, to facilitate, enable, or improve other transportation or processing steps or storage. Resizing could be accomplished at one or more possible stages, including, for example, pre-collection, pre-transport, pre-drying, pre-sterilization, pre-stabilization, and/or pre-packaging. In certain embodiments, resizing can be unnecessary, depending on the specific implementation options selected for other processing steps and storage.

Many technologies may be used for biomass resizing, including, for example, cutting, shredding, chopping, grinding, chipping, compression, extrusion, baling, and pelletization systems. Various technologies can also be used that effectively integrate resizing with other steps. For example, collection systems can involve biomass resizing, pelletization can provide stabilization, and bio-char production via pyrolysis for more advanced carbon stabilization may involve resizing.

Sterilization includes the process(es) by which biological degradation of biomass for SPBCS is controlled by limiting the presence of living organisms in or on the biomass. Note that sterilization generally refers to processes that eliminates or kills all forms of life. However, in the context of this description, sterilization can also refer to processes that reduce biological activity to a level sufficient to prevent biomass decay and associated releases of greenhouse gases. Sterilization could be accomplished via a one-time treatment of biomass prior to storage, by periodic treatments of stored biomass, and/or by continuous, essentially continuous, or periodic treatment of stored biomass. Sterilization can be accomplished before, during, or after drying, resizing, stabilization, packaging, or storage.

In certain embodiments, sterilization can be unnecessary or deferred for undefined or unlimited periods of time, depending on the specific implementation options selected for other processing steps. For example, certain storage systems can inherently limit biological activity or can be engineered to limit biological activity (e.g., mixing with concretes, plastics, foams such as polyethylene, and/or other long-lived solids or liquids). Alternatively, effective monitoring systems can provide for the implementation of sterilization only for stored biomass exhibiting signs of potential degradation (e.g., GHG emissions). Sterilization can also be directly or indirectly integrated with other processing steps. For example, steam dryer systems that effectively convert biomass moisture into steam can also advance sterilization. Compression or pelletization processes, as well as thermo-chemical transformations, can also advance sterilization.

Many technologies can be used for biomass sterilization. These technologies can employ, for example, heat, pressure, chemical, or irradiation. Technologies using heat and/or pressure sterilization methods can be used in SPBCS applications. However, the heat and/or pressure can result in thermo-chemical transformations of the biomass, including but not limited to de-volatilization or liquefaction. Sterilization systems employing heat and/or pressure can be integrated with technologies that harness resulting volatile compounds for their energy content (e.g., providing system heat for sterilization and de-volatilization).

Technologies using chemical sterilization methods can be used in SPBCS applications. These include exposure of biomass to certain gas or liquid phase chemicals before or during biomass storage. For example, biomass can be exposed to sterilizing compounds in a process unit or the chemicals can be circulated around the biomass while in storage vessels or enclosures. Many chemical sterilization methods involve oxidizing chemicals. Methods using oxidizing chemicals can require monitoring and management of potential biomass oxidation to limit conversion of biomass carbon to $CO_2$. Chemicals that can be applied to biomass sterilization include, but are not limited to, ethylene oxide, ozone, hydrogen peroxide, chlorine, or formaldehyde. A wide variety of chemical disinfectants or antiseptics can also be used to advance biomass sterilization to the extent required for SPBCS purposes, depending on options selected for other principle processes as well as on regulatory or market requirements.

Technologies using irradiation sterilization methods can be used in SPBCS. These methods include use of gamma radiation, x-ray radiation, and or electron beam processing in a variety of configurations.

Stabilization includes the process(es) by which degradation and/or mobilization of the stored biomass is controlled. Stabilization can be accomplished in one or more processing stages, in a stand-alone process, or integrated with processes advancing other processing steps. In various embodiments, stabilization can be unnecessary, depending on the options selected for other processing steps, and on regulatory or market considerations. Stabilization system designs can also reflect regulatory or market considerations, including the ability to measure and independently verify quantities and types of stored biomass carbon and/or the ability to extract and repurpose stored biomass.

Many technologies can be used for biomass stabilization. These include, for example, thermo-chemical transformations (e.g., carbonization, torefaction, pyrolysis, hydro-thermal treatements, etc.), physical processes applied to the biomass (e.g., compression, pelletization, briquetting, baling, etc.), and processes that combine biomass with agents that serve to stabilize the biomass carbon (e.g., cement, plastics, foams such as polyethylene foam, or other chemicals).

Packaging includes the process(es) by which biomass is placed into one or more containment vessels, chambers, wrappings, coatings, or matrixes for long term storage. Packaging also includes the containment vessels, chambers, wrappings, coatings, or matrixes used for SPBCS applications. Packaging can be accomplished in one or more processing stages, in a stand-alone process, or integrated with processes advancing other processing steps. In certain embodiments, packaging can be unnecessary, depending on options selected for other principle processing steps and on regulatory or market considerations.

Many technologies can be used for biomass packaging. These include, but are not limited to, bins, containers, boxes, wrappings (e.g., bale wrappings), or silos. Packaging materials include, but are not limited to, various types of plastic, ceramic, geo-polymer, earth/soil (compacted or not), rock, resin, glass, metal, foam, and various combinations thereof Packaging processes can include: simple dumping or pouring systems, stacking systems (e.g., of compressed biomass aggregates, or of packaging containing biomass solids), mixing and pouring systems (e.g., in the case of biomass stabilization by mixing with other agents), and/or compression systems. Packaging processes and materials can yield in-situ storage vessels or chambers or may yield packages suitable for transport to longer term storage facilities (e.g., that simplify loading into standard shipping containers).

Packaging containment vessels, chambers, and or matrixes can be designed to enable one or more other process steps, including: sterilization (initial and or ongoing), stabilization, sealing, storage, monitoring, and biomass repurposing, including extraction for such repurposing. For example, packaging can include combinations of access ports, valves, and/or instrumentation suitable to enable ongoing monitoring and verification of conditions and biomass within containment vessels, chambers, or matrixes, or suitable for periodic or ongoing circulation of compounds for sterilization or stabilization.

Sealing includes the process(es) by which biomass packaging is sealed for storage (e.g., long term storage). Sealing can be accomplished in one or more independent processes at various stages in the overall SPBCS process or can be integrated with processes advancing other principle processing steps. For example, sealing can limit gas and liquid exchange between the contained biomass and the surrounding environment to advance biomass containment. Sealing can include combinations of access ports, valves, and/or instrumentation suitable to enable ongoing monitoring and verification of the conditions and of the biomass within containment vessels, chambers, or matrixes. The access ports and valves can also be suitable for periodic or ongoing circulation of compounds for sterilization or stabilization or can be used to extract and utilize any products of degradation (e.g., biogenic methane). In certain embodiments, sealing can be unnecessary, depending on processing options selected for other principle processing steps and on regulatory or market considerations.

Many technologies may be used for sealing. These technologies can vary, for example, according to the sealant and/or containment vessel material, and/or containment vessel dimensions, as well as the storage environment. The specific choice of sealing technology may also influence other aspects of SPBCS including, but not limited to: sterilization (initial and or ongoing); stabilization; storage; monitoring; and potential biomass extraction and repurposing.

Storage includes the process(es) by which biomass is disposed of or retained to achieve isolation (e.g., long term isolation) from the natural environment. Storage can achieve any one or more of the following objectives: (i) preventing release of greenhouse gases; (ii) preventing biomass degradation or mobilization into the broader environment; (iii) enabling verification and monitoring of stored biomass as well as potential periodic or ongoing sterilization processes; and (iv) enabling utilization of biomass degradation products (e.g., biogenic methane). Storage systems can be closely related to and/or dependent on other principle process steps including, but not limited to, stabilization, packaging, sealing, monitoring, and potential repurposing. Storage systems can be designed to provide particular environmental controls and/or to limit the exposure of stored biomass or biomass packaging to environmental conditions (e.g., extreme temperature or pressure, excess moisture, chemical or biological agents, or other potentially compromising physical processes) that might compromise the objectives of SPBCS.

Storage systems can include or resemble: conventional land fill disposal sites; relatively smaller scale buried containment vessels or chambers; free standing structures, containment vessels or chambers, either enclosed within a larger structure or open to the elements; abandoned mines or mine shafts; abandoned, filled, or partially filled pit mine facilities; or structures submerged in fresh or marine water environments.

Monitoring includes the process(es) that enable any of: measurement and/or control of parameters affecting effective biomass storage; mitigation of undesirable conditions (including potential future applications of sterilization/disinfectant processes); and verification of carbon sequestration benefits. Monitoring can enable potential future or ongoing verification of carbon sequestration benefits. Monitoring can also enable accounting of carbon sequestration benefits lost due to biomass decay/degradation.

Monitoring can include the use of sensors or instruments for measuring temperature, pressure, chemical/gas composition, moisture/humidity, biological agents and the like. Monitoring can also include collection, monitoring and reporting of, and disposal, combustion or productive utilization of gases produced from biomass decomposition (e.g., methane) at the containment vessel or larger SPBCS storage facility/site-wide scale. Monitoring can include reporting and accounting systems to enable mitigation of undesirable conditions on a site and vessel specific basis and to support quantification and reporting of carbon benefits retained/lost over time. Furthermore, monitoring can include electrical systems such as sensors and computers to monitor, generate alarms, generate reports, or perform other functions.

Repurposing includes the process(es) that provide for the option of future extraction of stored biomass and utilization of the stored biomass for other purposes (e.g., building or construction materials, bio-energy feedstock). Repurposing can depend upon other steps that support future usability of stored materials. Repurposing can also include and one or more extraction systems, accounting systems, and reporting systems for carbon benefits gained (e.g., via fossil emissions displaced) or lost/foregone (e.g., sequestration benefits) as a result of biomass repurposing.

Implementation of SPBCS includes various advantages. At a high level, SPBCS uniquely combines and capitalize on two values embodied in biomass, embodied atmospheric carbon and embodied solar energy. For example, SPBCS quantifies and couples the environmental value of mitigating anthropogenic GHG emissions to an associated biofuel in the context of a regulatory framework. Thus, SPBCS provides a method and economic incentive for affecting climate change and other environmental objectives that could not have existed prior to the emergence of the regulatory framework. SPBCS can further provide for value from the resulting biomass resource stockpiles from potential future repurposing activities.

A person of ordinary skill in the art will understand that SPBCS can be readily implemented under various regulatory frameworks. Illustrative examples use three particular regulatory contexts and associated markets for carbon dioxide (and other greenhouse gas) emissions, tradable emissions credits, or low carbon fuels: the European Union Emissions Trading Scheme, the California Low Carbon Fuels Standard, and the U.S. Renewable Fuels Standard.

The European Union Emissions Trading Scheme provides emissions allowances and tradable credits that can be traded among firms. In this context, SPBCS could be qualified to receive tradable credits in proportion to the quantity of biomass carbon sequestered. Tradable credits could be issued directly to regulated firms for their participation in SPBCS projects, or could be issued via so called flexibility mechanisms, including via Joint Implementation as Emission Reduction Units, via Clean Development Mechanism as Certified Emissions, or via International Emissions Trading. Monetary value from such an SPBCS implementation could be generated by reduced compliance cost for regulated firms or through the marketing and sale of tradable credits issued. Note that this program is similar to what might be expected under other so called cap-and-trade type policy instruments.

The Low Carbon Fuel Standard, which is currently being implemented in California and British Columbia, Canada, and being considered for other regions, establishes a fuel carbon intensity standard defined generally in units of mass emissions per unit fuel energy—grams CO2 equivalent per mega-joule (gCO2e/MJ), for example. Regulated firms comply with the standard by submitting an accounting of net fuel emissions per unit of fuel energy provided. This accounting enables generation of tradable emissions credits for fuels provided by regulated firms with lifecycle greenhouse gas emissions intensities lower than the regulatory standard. Regulated firms must meet the standard by increasing supply such low carbon fuels and/or acquireing tradable emissions credits from other firms supplying such low carbon fuels. As such, tradable emissions credits issued under this framework are directly associated with the supply of low carbon fuels produced or supplied. Monetary value from such an SPBCS implementation could be generated by reduced compliance costs for regulated firms, the ability of firms to effectively offset emissions associated with relatively high carbon fuels they might provide, and/or through the marketing and sale of tradable emissions credits issued.

The Renewable Fuels Standard specifies quantities of fuels to be provided to U.S. markets. Quantity targets are specified for several categories of fuels. One of the characteristics distinguishing fuels across these categories is the lifecycle greenhouse gas emissions intensity—or carbon intensity—of the fuel. As such, fuels produced with SPBCS implementation in feedstock production could be qualified for a fuels category with a lower lifecycle greenhouse gas emissions intensity requirement. These fuels are expected to command a price premium, which is a basis for generating monetary value from such an SPBCS implementation.

Within the context of markets resulting from these and similar regulatory instruments and environments, several potential implementation models could be used to support SPBCS. Potential implementation models can be differentiated based on the point in the supply chain responsible for SPBCS implementation.

Implementation by independent operators. SPBCS could be implemented by an independent operator based on the value of resulting tradable credits. In this case, the SPBCS operator could purchase biomass from producers, process and store the biomass, quantify carbon stored, monitor the stored biomass, qualify LCA emissions accounting credits under any or all relevant regulatory frameworks, market resulting tradable credits to regulated parties, and account for any and all adjustments resulting from potential future repurposing activities. One variant of this case could be for the SPBCS operator to partner with a regulated party with standing under certain regulatory instruments (e.g., a biofuel producer regulated under a low carbon fuels standard) to qualify LCA emissions accounting credits from SPBCS implementation.

Implementation by regulated parties. SPBCS could be implemented by a party with compliance requirements under one or more relevant regulatory frameworks (e.g., biofuel producer obligated under a low carbon fuel standard) based on the value of resulting tradable emissions credits or allowances to the firm or on associated emissions trading markets. In this case, the regulated party could purchase biomass for SPBCS jointly with or independently from their purchases of other biomass feedstock (e.g., agricultural residues along with corn kernels or soybeans for biofuel production). They could take responsibility for all of the processes mentioned above, but would have the additional options of retaining resulting tradable emissions credits for their own compliance purposes or marketing them with their other products (e.g., biofuel) to regulated parties downstream in the supply chain in order to benefit from potential price premiums for low carbon products.

Implementation by biomass producers. SPBCS could be implemented by a biomass producer. In many cases, resulting implementation models would be analogous to implementation by an independent operator. However, biomass producers implementing SPBCS on biomass resulting as a co-product to primary biomass products (e.g., agricultural residues from production of feedstock for biofuel production) could profit from price premiums for primary products associated with lower embodied carbon emissions instead of qualification and sale of tradable emissions credits. This implementation model could be implemented in a stand-alone manner by biomass producers or in partnership with independent SPBCS operators, regulated parties (e.g., biofuel producers), or both to leverage the particular contributions of each party (e.g., specialization of SPBCS operators and regulatory standing of regulated parties).

Implementation for secondary values/repurposing. SPBCS can result in a unique combination of two products: biomass-embodied carbon, which is sequestered away from the atmosphere, and stockpiles of biomass resources. Stockpiled biomass resources can have a variety of potential values reflecting both conventional values of biomass resources (e.g., chemical and energy content) and unique temporal and spatial challenges associated with biomass feedstock supply. For example, the biomass supply is subject to seasonal variability and to potential disruptions from extreme weather, water, or pest-related events. Moreover, biomass supply chains are spatially limited from the inherent low density of production (due to inherently distributed solar energy supply) and from high transportation costs. For these and other reasons, the existence of large accumulated stockpiles of biomass could provide unique benefits to potential biomass-related projects.

For example, capital financing for a biomass project (e.g., bio-energy project) can face challenges from feedstock supply disruption risks and concomitant risks for capital capacity utilization. The availability of large biomass stockpiles could effectively insure against such supply disruptions and thereby enable effective project financing. Alternatively, the existence of large stockpiles can facilitate biomass projects (e.g., bioenergy projects) simply by concentrating biomass resources over time in a single location. Stockpiles can provide a critical mass of feedstock for launching new biomass projects, or may provide resources for periodic processing into other products and services (e.g., for bio-energy products, biochar soil amendments and the like) on a rotational basis (e.g., sequentially processing each SPBCS installation on an ongoing basis).

In many cases, carbon/climate benefits lost or foregone or traded (e.g., trading benefits of carbon sequestered for benefits of energy product substitution) due to biomass reprocessing/repurposing will need to be accounted for under appropriate regulatory frameworks (e.g., the frameworks that provided the carbon benefits that motivated SPBCS implementation). However, the quantity of foregone or traded carbon benefits and their value will depend on the particular reprocessing/repurposing options employed and potentially on the prevailing prices for tradable emissions credits at the time of reprocessing/repurposing. For example, biomass utilization in infrastructure projects or building materials (e.g., as a component in concrete or other building material) can effectively retain full or partial carbon benefits from SPBCS implementation. Alternatively, a bio-energy project, including projects that co-utilize biomass with fossil fuels (e.g., co-utilization of coal and biomass for heat, power, and/or fuels production), incorporating CO2 capture and storage in geologic formations (CCS) can retain 90% or more of carbon sequestration benefits from SPBCS implementation and add energy product substitution benefits. A bio-energy project, including projects that co-utilize biomass with fossil fuels (e.g., co-utilization of coal and biomass for heat, power, and/or fuels production), that does not include CCS will likely forego benefits of carbon sequestration from certain SPBCS implementation, but can provide energy product substitution benefits. However, the value foregone or traded can be limited by, among other things, the relative availability of other low cost options for mitigating anthropogenic greenhouse gas emissions (e.g., other low cost options may emerge that decrease the value of sequestration benefits or allow for CCS at reasonable cost, or low emission substitutes for certain energy products may not emerge, increasing the relative value of substitution benefits from bio-energy products) or less stringent future emissions targets.

EXAMPLES

Low CI Corn Ethanol under the California Low Carbon Fuels Standard, Methods of Engineering a Biofuel Cycle and Accounting for Carbon Flows and Determining a Regulatory Value for a Biofuel Example 1

Low CI Corn Ethanol under the California Low Carbon Fuels Standard

The California Low Carbon Fuels Standard represents one opportunity for implementing SPBCS. Under this standard, a biofuel producer could sponsor SPBCS implementation with the stover resulting from corn ethanol feedstock production and/or biomass resulting from other crops in the corn rotation. Analogous implementations, for example, could include those by biodiesel producers storing residues from soybean production. In the case of implementation by a corn ethanol producer, the ethanol producer could submit a new corn ethanol production pathway for approval by the California Air Resources board that reflects the implications of SPBCS implementation for lifecycle fuel carbon intensity. Approval of such a production pathway could yield issuance of additional tradable carbon credits for corn ethanol produced according to the new production pathway in proportion to the quantity of biomass stored via SPBCS. These tradable credits could be retained for the producer's compliance purposes, sold with their product ethanol to regulated parties downstream in the supply chain (e.g., fuel blenders), or sold to other regulated parties.

The biofuel can be produced from a first fraction of a biomass according to the various methods known in the art (e.g., wet mill or dry mill corn ethanol). Sequestration of a second fraction of the biomass (e.g., agricultural residue, including corn stover) can be accomplished by a number of steps known in the art, including but not limited to, the example outlined in Table 1. The manner in which SPBCS mitigates anthropogenic carbon emissions through engineering a biofuel carbon cycle is discussed, for example, in connection with Examples 2-4 below. A regulatory value for the biofuel can be calculated according to the regulatory framework, which is discussed, for example, in connection with Examples 4-7 below.

TABLE 1

| | |
|---|---|
| Biomass collection | Mechanized stover collection in large round bales |
| Drying | Air drying on the field or field edge to ~15% moisture |
| Resizing | Chopping or grinding at the field edge or at a nearby facility |
| Sterilization | Irradiation at a nearby facility, if necessary |
| Stabilization | Pelletization or compression into blocks, if necessary |
| Packaging | Dumping and compression of resized or pelletized stover or by stacking of compressed stover blocks at a purpose-built landfill type facility |
| Sealing | Clay and plastic liners and covers |
| Storage | In the dedicated landfill type facility |
| Monitoring | (optional) Temperature, pressure, and moisture sensors as well as methane gas collection, measurement, and combustion/utilization systems |
| Repurposing | (optional) Removal of the landfill cover and mechanized extraction of stored biomass (e.g., front loaders and dump trucks) for utilization in cellulosic ethanol production systems |

Figure 2:
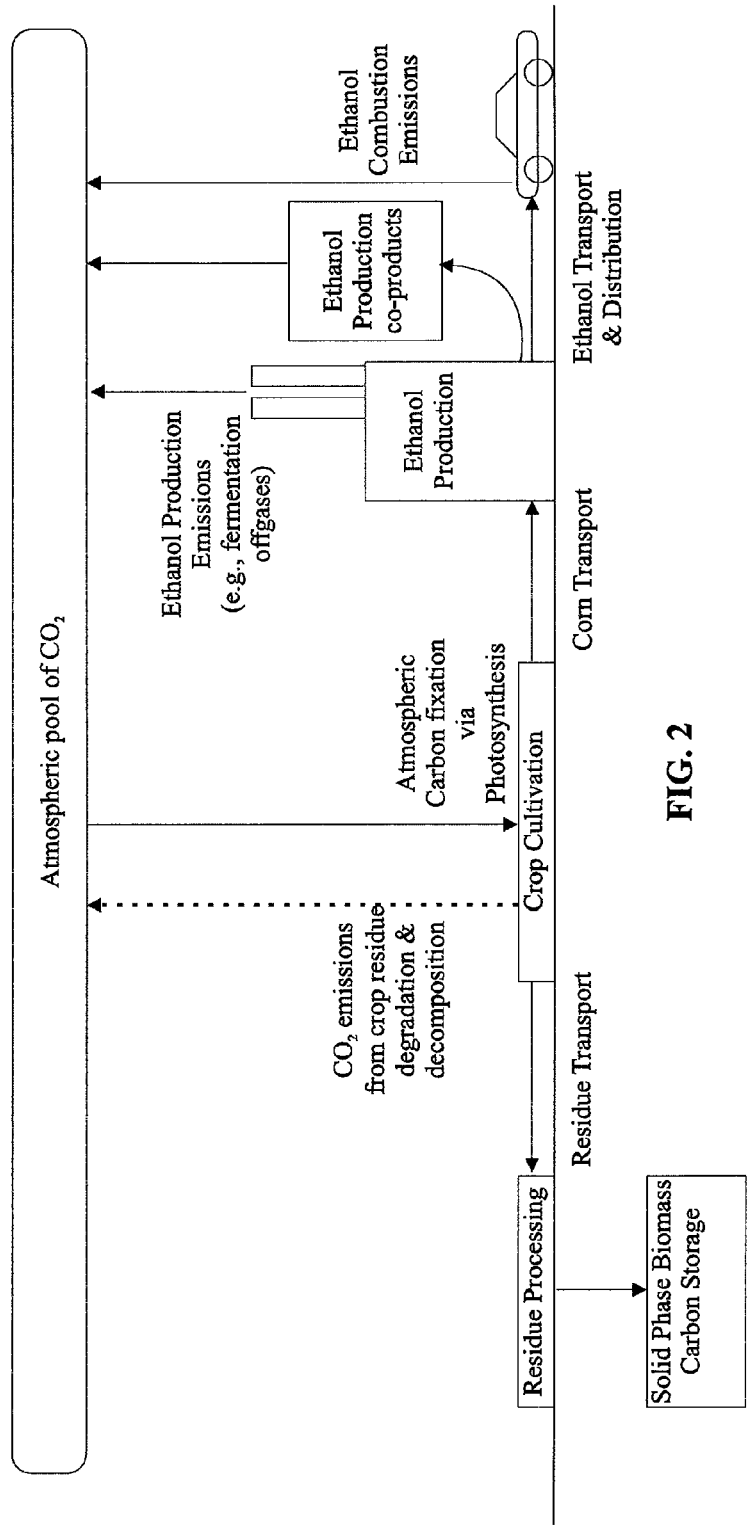
Figure 3:
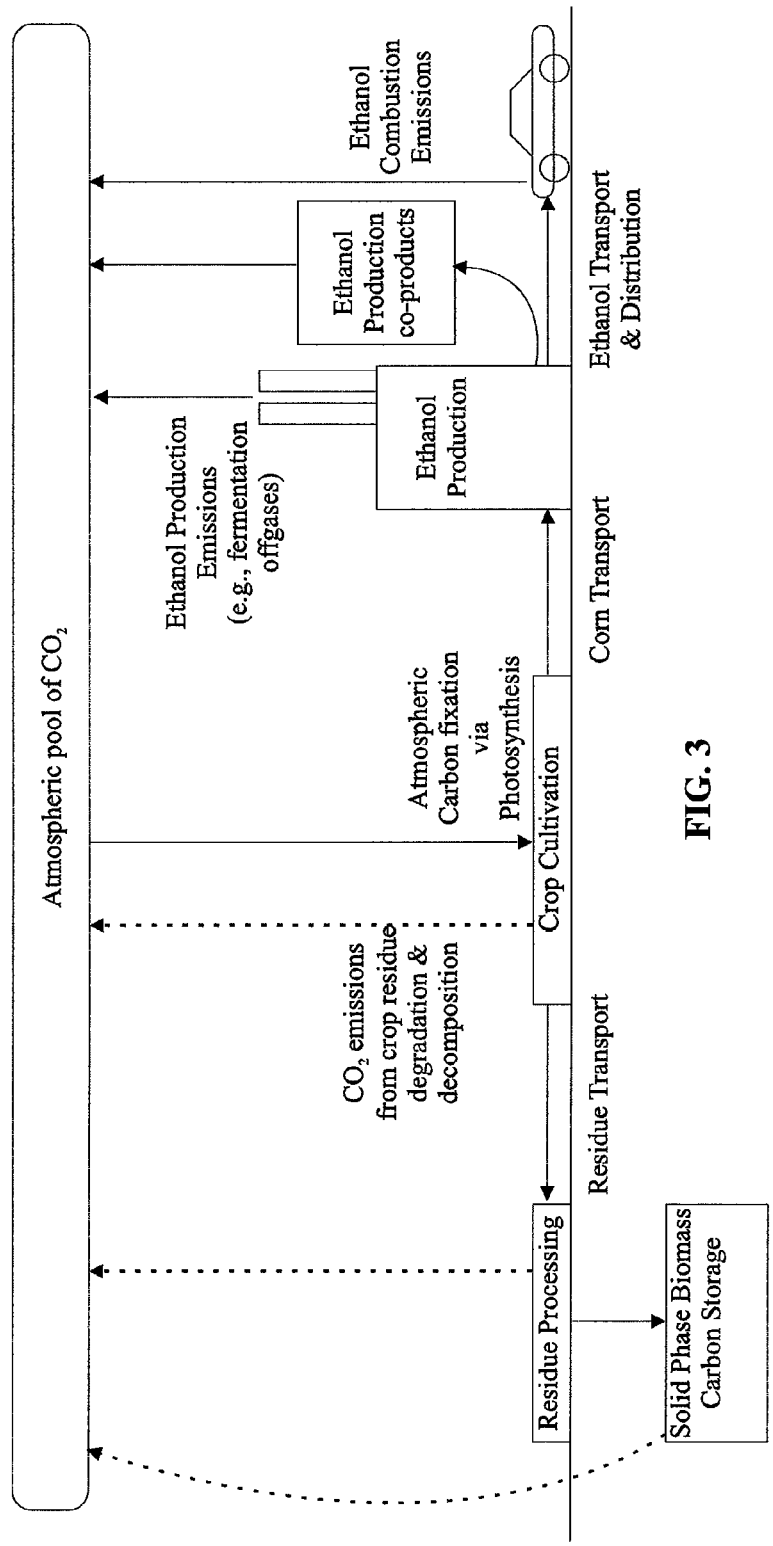
Figure 4:
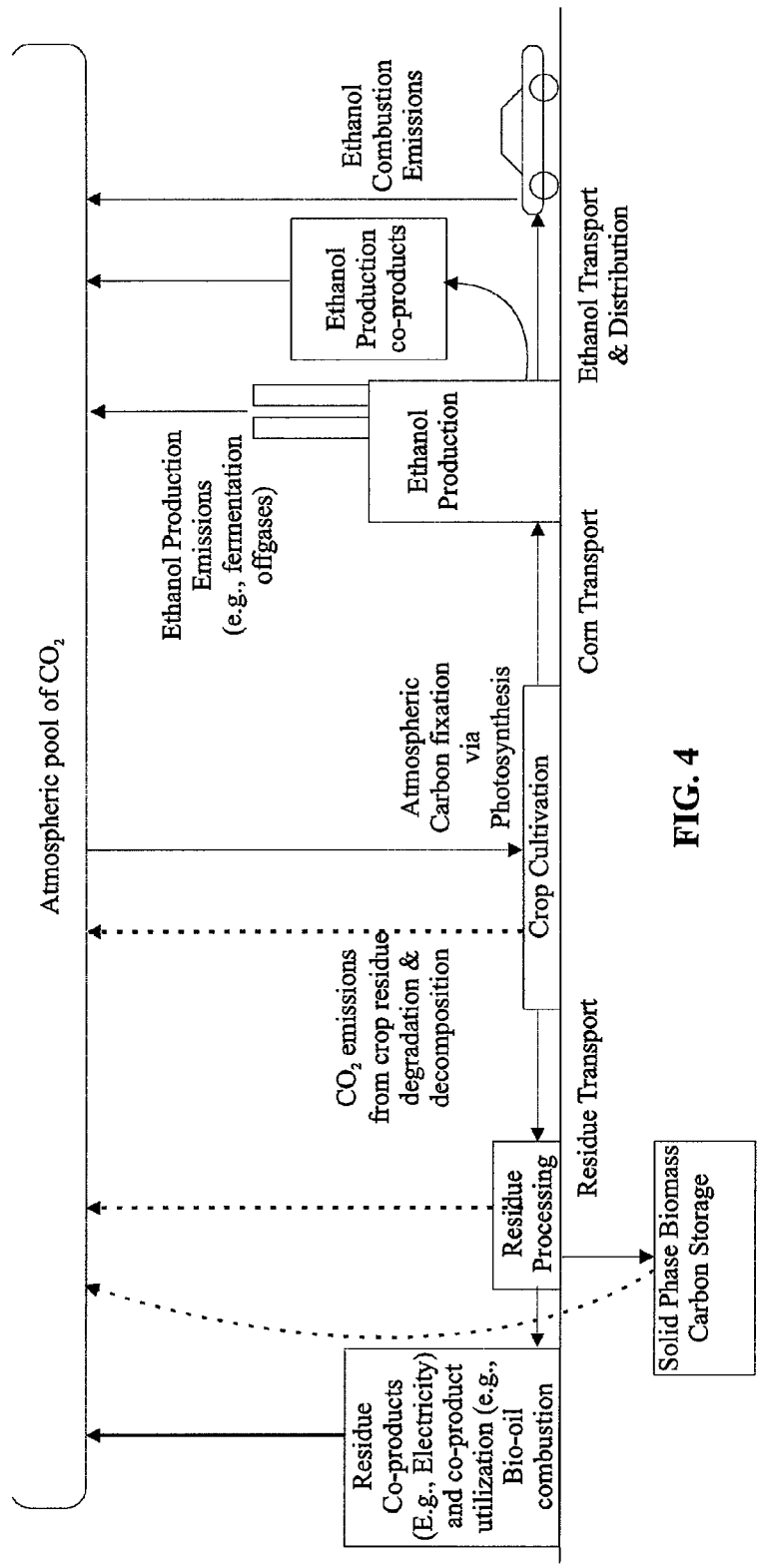

FIG. 1 shows biogenic carbon flows or carbon cycle in an example of conventional corn ethanol production and use. FIG. 1 is useful comparison for FIGS. 2-4, which illustrate examples of engineering a carbon cycle in the context of SPBCS to mitigate anthropogenic greenhouse gas emissions. FIGS. 2-4 also illustrate examples of carbon cycle components that can be used in determining a regulatory value that accounts for the carbon intensity and/or sustainability of a biofuel. The following examples can be mapped onto the process schematics shown in FIGS. 5 and 6, and algorithms discussed in connection with Tables 2-4, and analyzed to determine a regulatory value for a biofuel. These examples, together with the disclosure, also provide a framework and useful examples for applying the invention in the context of additional and/or future regulatory frameworks.

The carbon cycle shown in FIG. 1 can be considered to begin when biogenic carbon is fixed from the atmosphere via photosynthesis. The portion of the fixed carbon embodied in primary biofuel feedstock (e.g., corn kernels) is transported to an ethanol production facility. Separately, the portion of the fixed carbon embodied in agricultural residues is subject to natural degradation and decomposition, through which it is returned to the atmosphere. Ethanol is produced at the production facility from the primary biofuel feedstock. A portion of primary biofuel feedstock carbon is released to the atmosphere during ethanol production (e.g., via fermentation off-gases), while the balance is converted into biofuel (e.g., ethanol) and biofuel production co-products (e.g., animal feed, vegetable oils, and/or biodiesel). Then, the ethanol and ethanol production co-product(s) are used, and the biogenic carbon in the biofuel and biofuel production co-products is returned to the atmosphere. In some cases this return of biogenic carbon to the atmosphere can be direct (e.g., in the case of biofuel combustion) or indirect (e.g., in the case of animal feed co-product use).

Note that the figures focus on biogenic carbon flows in order to illustrate a principle of SPBCS. However, other flows of greenhouse gases are relevant to the biofuel carbon cycle and accounting for carbon flows and determining a regulatory value for a biofuel. For example, while regulatory values can be calculated solely from biogenic carbon flows, in many cases a consideration of carbon flows from fossil hydrocarbon sources (e.g., petroleum, coal, and the like) can be important in calculating a regulatory value. Examples of other relevant flows are discussed in connection with FIGS. 2-6 and Tables 2-4.

Example 1

SPBCS with Residue Transportation, Processing, and Storage

FIG. 2 shows biogenic carbon flows in an example of SPBCS in corn ethanol production, where the carbon cycle is engineered to include residue collection, transportation, processing, and storage. The storage of solid phase biomass carbon can prevent the emission of GHG by preventing the degradation of the solid phase biomass carbon. Thus, this example shows one way to engineer a carbon cycle to mitigate anthropogenic carbon emissions (e.g., in one sense, carbon from human activity is prevented from flowing to the atmosphere in gaseous form; in another sense, a renewable and low CI biofuel displaces the use of a fossil fuel, thereby reducing the CI of the human activity).

In FIG. 2, the fixing of biogenic carbon from the atmosphere, as well as the production and use of ethanol can be essentially the same as shown and described in connection with FIG. 1. A second fraction of the agricultural biomass (e.g., comprising agricultural residue), which embodies biogenic carbon, is transported for processing and, ultimately, storage. In this example, processing is employed to improve storage (e.g., to increase efficiency by making the residue easier to transport and store, and to decrease emissions by making the residue less susceptible to degradation). Storage can be continued indefinitely, or for another time scale relevant to the climate change or policy objective.

The second fraction of the agricultural biomass does not necessarily include all of the biomass that is not used for biofuel production (e.g., the balance of the corn plant after separation from the corn kernels). For example, some agricultural residue can be left in the field to support soil fertility, erosion protection, and other agricultural objectives. Such residue would be subject to natural degradation and decomposition processes, through which embodied carbon is returned to the atmosphere. This carbon flow is indicated with a dashed line to reflect its secondary impact in differentiating net carbon flows relative to those indicated in FIG. 1.

Example 2

SPBCS with Residue Transportation, Processing, and Storage

FIG. 3 shows biogenic carbon flows in an example of SPBCS in corn ethanol production, where the carbon cycle is engineered to include residue transportation, processing, and storage. FIG. 3 is a variation on FIG. 2, with additional indicia for carbon flows to the atmosphere from residue processing and storage.

In various embodiments, the residue processing can produce GHG emissions that should be accounted for in the corresponding biofuel's regulatory value. For example, heating the agricultural residue (e.g., to reduce mass, increase stability, and/or sterilize) can release GHG to the atmosphere. Similarly, processing by pyrolysis (e.g., to produce a stable bio-char or bio-coal) can release GHG to the atmosphere. Likewise, storage can produce GHG emissions that should be accounted for in the corresponding biofuel's regulatory value. Emissions from storage can be a result of natural process and/or repurposing.

Example 3

SPBCS with Agricultural Residue Co-Products

FIG. 4 shows biogenic carbon flows in an example of SPBCS in corn ethanol production, where the carbon cycle is engineered to include agricultural residue co-products. FIG. 4 is a variation on FIG. 3, with additional indicia for carbon flows to the atmosphere from residue co-products. In various embodiments, residue co-products can include residue processing by pyrolysis to produce heat, power, electricity, and/or fuels with sequestration of associated biochar). Depending on the specific residue processing technologies employed, some additional co-products may be produced along with solid phase biomass carbon for long term storage. In various embodiments, use of these co-products can result in additional GHG emissions (e.g., bio-oil combustion) or no GHG (e.g., electricity).

Example 4

Process Schematics for Lifecycle Emissions Accounting

The components of a SPBCS carbon cycle can be represented as process schematics. Such schematics can facilitate the conceptualization and/or mapping of a biofuel carbon cycle (e.g., including a fuel pathway) to an accounting system. In this example FIG. 5 shows a process schematic for lifecycle emissions accounting (e.g., related to FIG. 1 and Table 2) and FIG. 6 shows a process schematic for lifecycle emissions accounting for SPBCS corn ethanol (e.g., related to FIGS. 2-4 and Tables 3 and 4).

Figure 5:
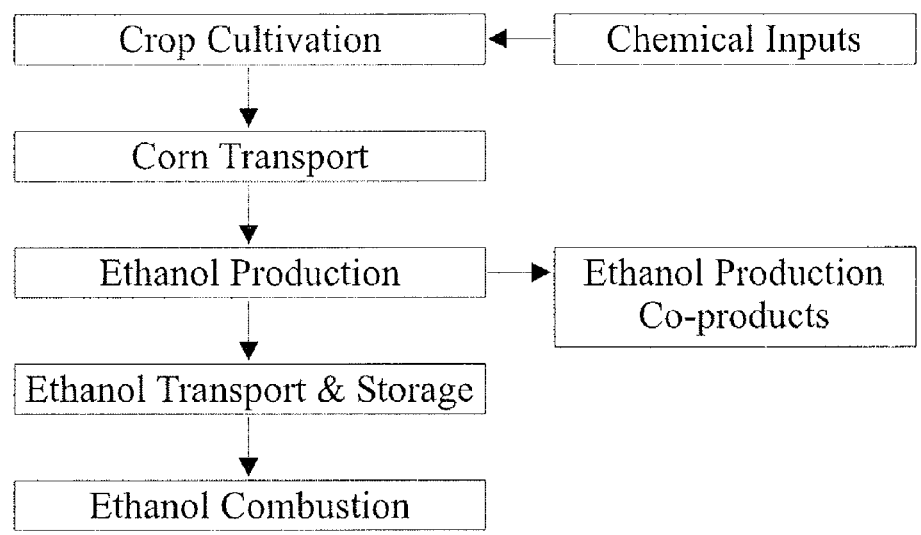
FIGS. 5 and 6 show example process schematics for lifecycle emissions accounting.

The schematic in FIG. 5 is adapted from FIG. 1 of the California Air Resources Board "Detailed California-Modified GREET Pathway for Corn Ethanol," which describes the lifecycle components used to define the lifecycle greenhouse gas emissions from corn ethanol production and to define the regulatory default value of carbon intensity to be applied to corn ethanol fuels under the California Low Carbon Fuel Standard. Such regulatory default values provide a baseline for a particular biofuel (e.g., ethanol with a carbon intensity=x). Entities would then have an environmental and economic incentive to engineer and/or characterize a biofuel carbon cycle that results in a biofuel with a more favorable regulatory value (e.g., ethanol with a carbon intensity<x, though the relationship may vary depending upon the metric of sustainability/CI and accounting convention).

Figure 6:
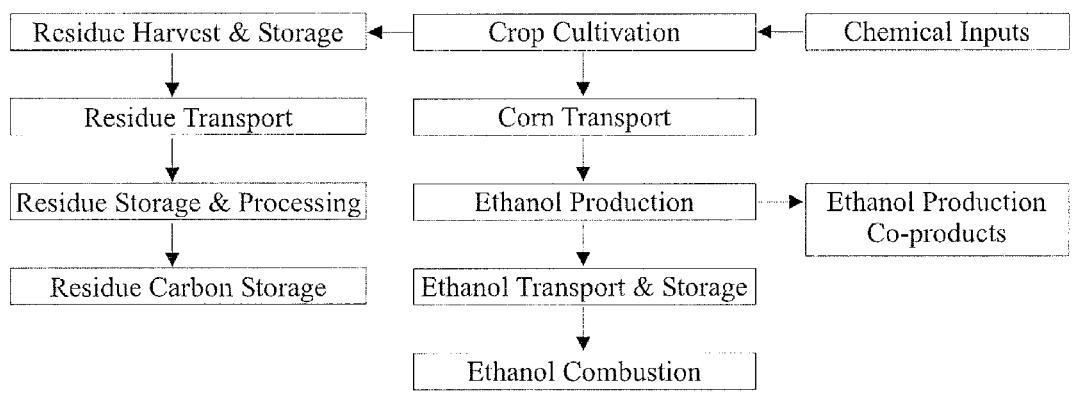

FIG. 6 shows an example process schematic for lifecycle emissions accounting for SPBCS corn ethanol. This schematic illustrates lifecycle components used to describe the lifecycle greenhouse gas emissions from SPBCS corn ethanol. One difference between this schematic and FIG. 5 is the column of lifecycle components on the left side of the figure, which describe processes associated with harvest, transport, residue storage & processing, and solid phase biomass carbon storage. Note that FIGS. 5 and 6 provide one convenient format for illustrating these lifecycle components, which can be alternatively illustrated with greater or fewer lifecycle components. Other formats are conceivable and would likely be required in other regulatory contexts. A person with ordinary skill in the art could adapt the present examples to other formats for illustrating, conceptualizing, and quantifying the lifecycle components and emissions from SPBCS. Such adaptations are included in SPBCS.

One feature of various embodiments of SPBCS is the inclusion of components describing the transportation, processing, and/or storage of agricultural residues that are produced as a consequence of biofuel feedstock cultivation (crop cultivation in the present example), for purposes that generate lifecycle emissions accounting credits within the biofuel lifecycle greenhouse gas emissions accounting schematic. No incentives existed for SPBCS, or the concept of developing new sources of lifecycle emission accounting credits, before the emergence of regulatory frameworks such as the EU-ETS and no incentives existed for developing new sources of lifecycle emissions accounting credits within fuel supply chains before fuel-specific regulatory frameworks including: U.S. RFS2; LCFS currently implemented in CA and BC, and being contemplated for WA, OR, and NEMA regions; EU-RED and FQD; and UK-RTFO.

Given a biofuel or biofuel carbon cycle, there are a number of ways to account for carbon flows and determine a regulatory value for the biofuel. In jurisdictions having an established regulatory system, a person of ordinary skill in the art would understand that they could first look to the established regulatory system for guidance in determining an applicable methodology. However, it is also understood that such systems are generally based upon quantifying relevant components of the biofuel carbon cycle and accounting for the relevant components to arrive at a net carbon intensity and/or sustainability measure for the biofuel.

The quantification of relevant carbon cycle components can be in terms of units of greenhouse gas per units of energy (e.g., gCO2e/MJ). The accounting methodology can be, for example, system expansion or allocation. In system expansion, lifecycle emissions accounting credits are provided for net emissions reductions associated with use of the various products as a substitute for more conventional products. Under allocation methodologies, a fraction of lifecycle emissions (generally emissions associated with processes upstream of the material diversion for co-product use) are allocated to the various products (see, e.g., Examples 6 and 7).

Example 5

Greenhouse Gas Emissions Summary for Corn Ethanol (Baseline)

Table 2 shows a greenhouse gas emission (GHG) accounting summary for dry and wet mill corn ethanol. This summary serves as a baseline for the SPBCS examples shown in Table 3 and 4. This summary is adapted from the California Air Resources Board 2009 "Detailed California-Modified GREET Pathway for Corn Ethanol," where the derivation of the values is provided in detail.

TABLE 2

| Corn Ethanol Fuel Cycle Components | Dry Mill GHG (gCO2/MJ) | Wet Mill GHG (gCO2/MJ) |
|---|---|---|
| Well-to-tank | | |
| Crop Cultivation | 5.65 | 5.81 |
| Chemical Inputs to Cultivation | 30.2 | 31.35 |
| Corn Transportation | 2.22 | 2.28 |
| Ethanol Production | 38.3 | 48.78 |
| Ethanol Transport & Storage | 2.7 | 2.63 |
| Ethanol Production Co-products | −11.51 | −16.65 |
| Total well-to-tank | 67.6 | 74.2 |
| Tank-to-wheel | | |
| Ethanol Combustion | 0 | 0 |
| Total tank-to-wheel | 0 | 0 |
| Total well-to-wheel | 67.6 | 74.2 |

In this example, the regulatory value for dry mill corn ethanol is 67.6 gCO2/MJ and the regulatory value for wet mill corn ethanol is 74.2 gCO2/MJ. The accounting shown in Table 2 (as well as Tables 3 and 4) reflects direct emissions only. Additional emissions factors for indirect emissions (e.g., indirect land use change) can also be included within an accounting framework, as can other combinations of direct emissions. For example, additional emissions factors or other accounting may also be included to represent increased fertilizer requirements to compensate for nutrients removed with agricultural residues. In examples 5-7, the Ethanol Combustion values assume all carbon in the fuel itself is biogenic and therefore do not represent a net emission to the atmosphere.

Example 6

GHG Summary for Corn Ethanol (SPBCS, System Expansion Methodology)

Table 3 shows a greenhouse gas emissions summary for dry and wet mill corn ethanol for a SPBCS methodology.

TABLE 3

| Corn Ethanol Fuel Cycle Components | Dry Mill GHG (gCO2/MJ) | Wet Mill GHG (gCO2/MJ) |
|---|---|---|
| Well-to-tank | | |
| Crop Cultivation | 5.65 | 5.81 |
| Chemical Inputs to Cultivation | 30.2 | 31.35 |
| Corn Transportation | 2.22 | 2.28 |
| Ethanol Production | 38.3 | 48.78 |
| Ethanol Transport & Storage | 2.7 | 2.63 |
| Ethanol Production Co-products | −11.51 | −16.65 |
| Residue Harvest & Storage | 1.70 | 1.74 |
| Residue Transportation | 2.22 | 2.28 |
| Residue Storage & Processing | 0 | 0 |
| Residue Carbon Storage | −93.4 | −90.0 |
| Total well-to-tank | −21.9 | −11.7 |
| Tank-to-wheel | | |
| Carbon in fuel | 0 | 0 |
| Total tank-to-wheel | 0 | 0 |
| Total well-to-wheel | −21.9 | −11.7 |

In this example, the regulatory value for dry mill corn ethanol is −21.9 gCO2/MJ and the regulatory value for wet mill corn ethanol is −11.7 gCO2/MJ. In comparison to Example 5, SPBCS provides a significant benefit in terms of providing the corn ethanol with a more favorable regulatory value than the baseline. Thus, the environmental and accounting value of Residue Carbon Storage is large (e.g., dominates the calculation of the regulatory value) and the environmental and accounting cost of terms such as Residue Harvest & Storage, Residue Transportation, and Residue Storage & Processing is small (e.g., less than that of biofuel production and little effect on the regulatory value).

In this Example, the Residue Harvest & Storage value assumes that residue harvest requires 30% of the energy required (yielding 30% of the GHG emissions) for crop cultivation (e.g., corn farming) and has zero storage losses. The Residue Transportation value assumes that transportation emissions are equal to those for transporting the corn, based on 1:1 mass ratio (see below). However, emissions could be substantially higher (e.g., due to substantially lower density of stover, which could be mitigated by processing the agricultural residue) as well as differences in transportation mode (e.g., vehicle type, distance, and the like) and/or distance (in the case that biofuel and residue processing facilities are not co-located).

Residue Storage & Processing value assumes exothermic hydrothermal treatment yields zero net GHG emissions and transforms 100% of residue biomass carbon into resulting "bio-coal" for sequestration. Residue Carbon Storage value assumes 100% of carbon in removed residues is effectively sequestered (no storage losses, processing losses, or leakage from storage facilities), calculated using the computational algorithm as specified in Table 3.

Example 7

Computational Algorithm for Defining Lifecycle Emissions Accounting Credits Produced via SPBCS, Applied in the Context of the California Low Carbon Fuel Standard (SPBCS, System Expansion Methodology)

Table 4 shows an example of computational algorithm for defining lifecycle emissions accounting credits produced by SPBCS applied in the context of the California Low Carbon Fuel Standard. The Carbon intensity reduction reflects the amount of solid phase biomass carbon sequestered. The Carbon intensity reduction from SPBCS values shown in Table 5 were calculated according to the following methodology.

TABLE 6

| Parameter | Dry Mill | Wet Mill | Units |
|---|---|---|---|
| Stover carbon content [% wt, dry] | 0.5 | 0.5 | kgC/kg(stover) |
| Stover:kernal mass ratio | 1 | 1 | kg(stover)/kg(kernel) |
| Fraction of stover utilized | 0.5 | 0.5 | kg(stover removed)/kg(stover produced) |
| Corn kernel mass (dry) | 21.5 | 21.5 | kg/bu |
| Corn ethanol yield | 2.62 | 2.72 | gal/bu |
| Ethanol heat content | 76330 | 76330 | btu/gal |
| $CO_2$:C mass ratio | 3.67 | 3.67 | $gCO_2$/gC |
| Energy unit conversion factor | 947.8 | 947.8 | btu/MJ |
| Mass unit conversion factor | 1000 | 1000 | g/kg |
| Algorithm output | | | |
| Carbon intensity reduction from SPBCS | 93.4 | 90.0 | $gCO_2$/MJ(eth) |

In this example, the reduction in regulatory value for dry mill corn ethanol is 93.4 $gCO_2$/MJ and the reduction in regulatory value for wet mill corn ethanol is 90.0 $gCO_2$/MJ. These values are used in Example 6.

In Example 7, the Assumptions are defined as follows: Stover:kernel mass ratio defines the ratio of corn stover yield to corn kernel yield on a dry mass basis; Fraction of stover removed defines the fraction of corn stover removed from the field, with the remainder assumed to be left in place to advance erosion protection, soil fertility, and other agricultural objectives; Corn kernel mass (dry) defines the mass of a bushel of corn kernels; Corn ethanol yield defines the ethanol produced per bushel of corn kernels; Ethanol heat content defines the heating value of anhydrous ethanol produced—a lower heating value is used here to be consistent with the standard applied under the California Low Carbon Fuel Standard; $CO_2$:C mass ratio is used to convert between mass units of carbon and carbon dioxide, it is defined as the ratio of the molecular weights of the carbon in carbon dioxide (44/12). Energy unit conversion factor is used to convert between Imperial and metric units of measure for fuel heat content (btu or British thermal units and mega joules, respectively). Mass unit conversion factor is used to convert units of mass from kilograms to grams, it is defined as the number of grams in a kilogram (1000)

In Example 7, the algorithm output is the product of all of the factors listed under "Assumptions" above, except "Corn Ethanol Yield" and "Ethanol Heat Content", the inverses of which are multiplied by the product of the other factors in the algorithm. Example 7 shows one of many possible implementations of the algorithm. Other implementations could be applied within the context of the California Low Carbon Fuel Standard, and other implementations would almost certainly be required to utilize the invention in the context of fuel policies in other jurisdictions (e.g., BC LCFS, UK RTFO and EU RED and FQD). In these and other embodiments, loss factors could be applied or other means of accounting for carbon losses and/or GHG emissions from residue carbon losses due to degradation during Residue Storage, transport, and the like. Differences in GHG emissions from biomass transport, due to a process implementation warranting alternate assumptions, for example, would need to be reflected. Any fossil greenhouse gas emissions from Residue Processing or Residue Carbon Storage operations would also need to be included in the algorithm.

While the technology has been particularly shown and described with reference to specific embodiments, it should be understood by those skilled in the art that various changes in form and detail may be made without departing from the spirit and scope of the technology as defined by the appended claims.

The invention claimed is:

1. A computerized method of using a data processor having a memory to account for carbon flows and determine a regulatory value for a biofuel comprising ethanol, the method comprising:
   storing, by the data processor, in memory, one or more first values characterizing carbon flows associated with the production and use of ethanol, wherein the ethanol is derived from a first fraction of an agricultural biomass;
   storing, by the data processor, in memory, one or more second values characterizing carbon flows associated with sequestration of solid phase biomass carbon comprising stover or a product of processing stover, wherein the stover or a product of processing stover is derived from a feedstock residue of the agricultural biomass and wherein the sequestration of the stover or a product of processing stover mitigates anthropogenic greenhouse gas emission;

calculating, using the data processor, the regulatory value for the ethanol from the first values and the second values; and qualifying the ethanol as compliant with a regulatory framework using the regulatory value.

2. The method of claim 1 further comprising qualifying the ethanol for a fuels category with a lower lifecycle greenhouse gas emissions intensity requirement.

3. The method of claim 1 further comprising qualifying the ethanol in the regulatory framework as a fuel with a lower lifecycle greenhouse gas emissions intensity.

4. The method of claim 1 wherein the regulatory framework is the U.S. Renewable Fuels Standard, the California Low Carbon Fuels Standard or the European Union Emissions Trading Scheme.

5. The method of claim 1, wherein the sequestration comprises processing to mitigate degradation of the stover or a product of processing stover.

6. The method of claim 1, wherein processing comprises one or more of collection, drying, resizing, sterilization, stabilization, packaging, and sealing.

7. The method of claim 1, wherein the sequestration comprises storing the stover or a product of processing stover to mitigate environmental interaction.

8. The method of claim 1, further comprising monitoring carbon flow from the sequestered stover or a product of processing stover.

9. The method of claim 1, further comprising repurposing the sequestered stover or a product of processing stover.

10. The method of claim 1 further comprising:
generating a tradable credit from the regulatory value for the ethanol; and
trading the ethanol having the tradable credit.

11. A method of engineering a carbon cycle for ethanol production and use, comprising:
arranging production of the ethanol by a first generator, the ethanol produced from ethanol feedstock of an agricultural biomass;
arranging sequestration of solid phase biomass carbon comprising stover or a product of processing stover, by a storage system, from feedstock residue of the agricultural biomass, thereby mitigating anthropogenic greenhouse gas emission; and
assigning to the ethanol a regulatory value based at least in part upon a first set of one or more emissions credit values characterizing production and use of the ethanol and a second set of one or more emissions credit values characterizing the sequestration.

12. The method of claim 11 further comprising qualifying the ethanol as compliant with a regulatory framework.

13. The method of claim 11 further comprising qualifying the ethanol for a fuels category with a lower lifecycle greenhouse gas emissions intensity requirement.

14. The method of claim 11 further comprising qualifying the ethanol in the regulatory framework as a fuel with a lower lifecycle greenhouse gas emissions intensity.

15. The method of claim 12 wherein the regulatory framework is the U.S. Renewable Fuels Standard, the California Low Carbon Fuels Standard, or the European Union Emissions Trading Scheme.

16. The method of claim 11, wherein the sequestration comprises processing to mitigate degradation of the stover or a product of processing stover.

17. The method of claim 11, wherein the sequestration comprises storing the stover or a product of processing stover to mitigate environmental interaction.

18. The method of claim 11, further comprising monitoring carbon flow from the sequestered stover or a product of processing stover.

19. The method of claim 11, further comprising repurposing the sequestered stover or a product of processing stover.

20. The method of claim 11, further comprising:
generating a tradable credit from the regulatory value for the ethanol; and
trading at least one of the ethanol having the tradable credit and the tradable credit.

21. A method of manufacturing ethanol, comprising:
producing, by a generator, the ethanol from ethanol feedstock of an agricultural biomass;
sequestering, by a storage system, solid phase biomass carbon comprising stover or a product of processing stover from feedstock residue of the agricultural biomass, wherein sequestration mitigates anthropogenic greenhouse gas emission; and
assigning to the ethanol a regulatory value based at least in part upon a first set of one or more emissions credit values characterizing production and use of the ethanol and a second set of one or more emissions credit value characterizing the sequestration.

22. The method of claim 21 further comprising qualifying the ethanol as compliant with a regulatory framework using the regulatory value.

23. The method of claim 21 further comprising qualifying the ethanol in the regulatory framework as a fuel with a lower lifecycle greenhouse gas emissions intensity.

24. The method of claim 21 further comprising qualifying the ethanol for a fuels category with a lower lifecycle greenhouse gas emissions intensity requirement.

25. The method of claim 22 wherein the regulatory framework is the U.S. Renewable Fuels Standard, the California Low Carbon Fuels Standard, or the European Union Emissions Trading Scheme.

26. The method of claim 21, wherein the sequestration comprises processing to mitigate degradation of the stover or a product of processing stover.

27. The method of claim 21, wherein the sequestration comprises storing the stover or a product of processing stover to mitigate environmental interaction.

28. The method of claim 21, further comprising monitoring carbon flow from the sequestered stover or a product of processing stover.

29. The method of claim 21, further comprising repurposing the sequestered stover or a product of processing stover.

30. The method of claim 21, further comprising generating a tradable credit from the regulatory value for the ethanol.

31. The method of claim 30, further comprising selling or marketing at least one of the ethanol and tradable credit.

32. The method of claim 30, further comprising retaining the tradable credits.

33. The method of claim 30, further comprising marketing or selling the tradable credits to a regulated party.

34. The method of claim 33, wherein the regulated party is located downstream in the supply chain.

* * * * *

UNITED STATES PATENT AND TRADEMARK OFFICE
CERTIFICATE OF CORRECTION

PATENT NO. : 8,600,865 B2  
APPLICATION NO. : 13/608828  
DATED : December 3, 2013  
INVENTOR(S) : James S. Rhodes, III Page 1 of 1

It is certified that error appears in the above-identified patent and that said Letters Patent is hereby corrected as shown below:

On the title page item (73) replace "Sammarnish" with "Sammamish"

Signed and Sealed this
Fifteenth Day of April, 2014

Michelle K. Lee
*Deputy Director of the United States Patent and Trademark Office*